(12) United States Patent
Pitkow

(10) Patent No.: US 7,038,680 B2
(45) Date of Patent: May 2, 2006

(54) SYSTEM FOR GRAPHICAL DISPLAY AND INTERACTIVE EXPLORATORY ANALYSIS OF DATA AND DATA RELATIONSHIPS

(75) Inventor: James E. Pitkow, San Francisco, CA (US)

(73) Assignee: XEROX Corporation, Stamford, CT (US)

( * ) Notice: Subject to any disclaimer, the term of this patent is extended or adjusted under 35 U.S.C. 154(b) by 253 days.

(21) Appl. No.: 10/043,371

(22) Filed: Jan. 9, 2002

(65) Prior Publication Data

US 2003/0128212 A1 Jul. 10, 2003

(51) Int. Cl.
*G06T 11/20* (2006.01)

(52) U.S. Cl. ...................... 345/440; 345/629

(58) Field of Classification Search ............ 345/418, 345/581, 619, 744, 749, 185 FOR, 440, 629, 345/661, 665, 671, 680, 764, 765, 767, 780, 345/783, 788, 790, 800, 801, 802, 109 FOR; 348/211.3; 709/107, 203, 219, 311, 106, 709/112; 725/4, 709; 702/16
See application file for complete search history.

(56) References Cited

U.S. PATENT DOCUMENTS

| | | | | |
|---|---|---|---|---|
| 5,121,469 A | * | 6/1992 | Richards et al. ............ | 345/595 |
| 5,632,009 A | | 5/1997 | Rao et al. .................... | 395/770 |
| 5,745,891 A | | 4/1998 | Minakuchi et al. ............ | 707/3 |
| 5,880,742 A | | 3/1999 | Rao et al. .................... | 345/440 |
| 5,883,635 A | | 3/1999 | Rao et al. .................... | 345/440 |
| 5,966,139 A | * | 10/1999 | Anupam et al. ............ | 345/440 |
| 5,970,493 A | | 10/1999 | Shoup et al. ............... | 707/100 |
| 6,021,215 A | | 2/2000 | Kornblit et al. ............ | 382/141 |

(Continued)

OTHER PUBLICATIONS

Ramana Rao and Stuart K. Card, Xerox Palo Alto Research Center, The Table Lens: Merging Graphical and Symbolic [online], Apr. 1994, [retrieved on Aug. 12, 2004]. Retrieved from the Internet:<URL:http://www.ramanarao.com/papers/tablelenschi94.pdf.*

(Continued)

*Primary Examiner*—Matthew C. Bella
*Assistant Examiner*—G. F. Cunningham
(74) *Attorney, Agent, or Firm*—Fliesler Meyer LLP

(57) ABSTRACT

A system for graphically displaying data, and for allowing users to interactively analyze said data, particularly with respect to detecting and analyzing any relationships within said data. The invention is particularly suited to analysis of large multi-variate matrix data or two-dimensional data sets that can be stored in a data array. The system includes a visual Data Pane, that is used by an operator to provide a focus+context view into the data. Each data item is initially presented as a small object or region on the operator's screen. In response to an operator signal, the source data value and data type of a source data item in the array is obtained and indirectly represented in the Data Pane image. During a focusing operation the area of interest within the constraints of the Data Pane window is expanded, and related or more detailed data is presented to the user.

38 Claims, 20 Drawing Sheets

U.S. PATENT DOCUMENTS

| | | | |
|---|---|---|---|
| 6,055,550 A | 4/2000 | Wallack | 707/509 |
| 6,085,202 A | 7/2000 | Rao et al. | 707/509 |
| 6,108,657 A | 8/2000 | Shoup et al. | 707/100 |

OTHER PUBLICATIONS

U.S. Appl. No. 09/488,563, filed Jan. 21, 2000, Card et al.

Ahlebert, et al., "Dynamic Queries for Information Exploration: An Implementation and Evaluation", Proceedings of the ACM SIGCHI Conference on Human Factors in Computing Systems, 1992, pp. 619-626, ACM.

Ahlberg, et al., "AlphaSlider: A Compact and Rapid Selector", Proceedings of the ACM SIGCHI Conference on Human Factors in Computing Systems, 1994 pp 365-371, ACM.

Readings in Information Vusualization: Using Vision to Think (Morgan Kaufmann Series in Interactive Technologies) by Stuart K. Card, Jock D. MacKinlay 9Editor), and Ben Shneiderman (Editor), Morgan Kaufmann Publishers, Jan. 25, 1999, ISBN: 1558605339 (Table of contents only).

Eureka Product Description from www.inxight.com.

* cited by examiner

FIG. 2

SYSTEM FOR GRAPHICAL DISPLAY AND INTERACTIVE EXPLORATORY ANALYSIS OF DATA AND DATA RELATIONSHIPS

CROSS REFERENCES

This application is related to "METHOD AND SYSTEM FOR PRODUCING A TABLE IMAGE SHOWING INDIRECT DATA REPRESENTATION", U.S. Pat. No. 5,632,009, issued May 20, 1997; "SPREADSHEET IMAGE SHOWING DATA ITEMS AS INDIRECT GRAPHICAL REPRESENTATIONS", U.S. Pat. No. 5,880,742, issued Mar. 9, 1999; "PRODUCING A SINGLE-IMAGE VIEW OF A MULTI-IMAGE TABLE USING GRAPHICAL REPRESENTATIONS OF THE TABLE DATA", U.S. Pat. No. 5,883,635, issued Mar. 16, 1999; and "METHOD AND SYSTEM FOR PRODUCING A TABLE IMAGE HAVING FOCUS AND CONTEXT REGIONS", U.S. Pat. No. 6,085,202, issued Jul. 4, 2000; hereinafter referred to collectively as Rao and Card, and to copending application "MEDIUM CONTAINING INFORMATION GATHERED FROM MATERIAL INCLUDING A SOURCE AND INTERFACE FOR GRAPHICALLY DISPLAYING THE INFORMATION", application Ser. No. 09/488,563, Inventors: Stuart Kent Card, Tobias Hoellerer, James Edward Pitkow, and Richard Carl Gossweiler III, filed Jan. 21, 2000; all of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention relates generally to systems and methods for graphically displaying data, and for allowing users to interactively explore said data by viewing selected regions of interest in a Data Pane.

BACKGROUND

Many fields of industry depend on manipulating and interpreting large sets of data. These include the obvious fields of statistics, genetics, engineering, science, astronomy, and the like, but also include perhaps less evident fields such as marketing, news media, telecommunications, medicine, finance, and library science. A common use of such data is for research and analysis.

Traditional systems used to interpret such data rely on representing the data to the user of the system in a format that conveys and enhances the understanding of the information in an effective manner, and permits the system user to quickly and efficiently specify and locate information of particular interest. A familiar presentation form for the presentation of structured information is that of an image of a table, also referred to herein as a "table image", the particular details of which are disclosed in detail in U.S. Pat. Nos. 5,632,009, 5,880,742, 5,883,635 and 6,085,202, hereinafter referred to collectively as "Rao & Card", and disclosed herein by reference. As used in the context of this application a "table" is an orderly, rectilinear arrangement of information, ordered in a rectangular form of rows and columns and having identifiers, such as labels, arranged at the periphery of the table. The intersection of a row and column in a table defines a data location, typically called a "cell", and may include alphabetic and numeric character data or arithmetic operators or formulas. A popular application of a table image is the "spreadsheet" presentation format used by spreadsheet applications to present a tabular image of underlying data stored in the memory of a system.

In the context of this invention a "data image" is a larger set of data information, which may include tables, but may also include such display mechanisms as scatter plots and contour plots. Locations in data images can be defined by the intersection of "coordinates" in two or more dimensional axes.

While most research and analysis can be classified as direct, or targeted to a specific investigation, a large portion of such research is serendipitous in nature, and includes the stereotypical image of the scientist poring over large volumes of data, trying to ascertain perhaps that best combination of results, or those results which are dependent on, or effect, other measurements outside the immediate scope of the data. The ever-increasing importance of computer techniques has usurped that image of the scientist poring over a set of books with one of a scientist poring over a computer screen, upon which graphical representations of the data are shown. The common format of this representation are lists, tables, graphs, scatter plots, etc., which share a common attribute in that they are all somewhat "dumb", and don't provide much to the viewer beyond that which a paper printout would provide. As such the traditional methods of computerized data representation and visualization are sorely lacking in the degree to which they make the most of modern computer processing power.

One problem common with the presentation of data in a table image format of any size involves the display of character, or non-graphical, display features such as text and numbers, in the table or image cells or regions representing the data in the information structure. Rows and columns of text and numbers do not necessarily present the information in the data structure in a form meaningful for detecting patterns in the information, or for seeing overall trends in the data. Another problem specifically involves the presentation of large table images representing a large information structure when there is too much data for all of the data to be clearly presented in a table image that fits in the display area of the system display device. To address this problem, some application programs present only a portion of the table image in the display area, and provide a function for the system user to scroll through the table image to reach portions not currently visible in the display area in order to access the data represented by the character images in the table cells. As scrolling brings new cells of the table image into view in the display area, the previously displayed cells, including row and column identifiers such as labels, typically disappear from the display area, and global context information, important for navigating around the table image and for understanding the data that is currently displayed, is lost from the systems user's view. This presentation technique of scrolling through a large table image is sometimes referred to as a "time strategy" for presenting information, in that the user controls the display of sequential multiple views of the data over a period of time in order to view all of the data.

A number of other information presentation techniques are useful for presentation of data information on visual displays. One such technique is the "space strategy", which uses layout and graphic design techniques to present substantially all the information in a particular data structure within one view in the workspace or working windows. The space strategy typically involves the presentation of information in a primarily graphical or pictorial form rather than in non-graphical or character or textual form because of the size limitations of the work space of a given display device, and because of limitations on the amount of detail that a user is actually able to perceive within a particular area of the workspace.

Another design strategy involves the presentation of specific information of particular interest to a system user while concurrently maintaining and displaying the global context and structure of the body of information from which the specific information was selected, thus providing a balance of local detail and global context. Local detail is needed for local interactions with, or local investigation of, the data, while the global context is needed to tell the user what other parts of the data exist and where they are located in the workspace. One common implementation of this strategy presents the global information in less detail than the local information. This strategy may be considered a combination of the time and space strategies discussed above.

Both the time and space strategies or techniques are especially important when the data to be presented is part of a large information structure, such as a computer program, a database, a large collection of documents, etc., but they are also useful for the presentation of information structures of virtually any size. The subsequent discussion of the application of these strategies in the invention described herein as applied to such large information structures is not intended to necessarily limit the invention's application to large data structures.

Some attempts have been made to augment the traditional computerized or computer-based data visualization process using such design strategies. Foremost among these attempts are the various table-oriented visualization tools, such as the Table Lens product from Xerox, Inc., which acts as an intelligent magnifying glass or window that can be moved around a table of data, or a spreadsheet, by a human operator or user. As the window is moved over a section of data or a number of data cells, the underlying source data is parsed for references to additional data that is referenced or related to the visible data cells on the screen. This additional data is used to modify the window, perhaps adding color, or displaying the actual additional data, for those cells contained within the window or workspace. FIG. 1 shows an example of a focus+context matrix as it might be applied to a spreadsheet. In this example, a central focus region denoted by the matrix of rows 4–6 and columns G-I is created so as to "drill-down" or interrogate the related underlying data. The method can for example be used to provide a focus+context view into a table as further illustrated in the Table Lens illustrated in FIG. 2. As shown in FIG. 2, the Table Lens can be used to provide a detailed view into the data supporting the graphical view appearance of the table shown therein. The details of these and other related systems are described in detail in Rao & Card, which describes primarily the Table Lens technologies.

SUMMARY

To address the need for improved data viewing techniques that can be used with a wider variety of multi-dimensional data, the invention provides a system for graphically displaying data, and for allowing users to interactively explore said data, particularly with respect to detecting and analyzing any relationships within said data. A mechanism is provided for allowing users to interactively explore large data sets, such as scatter plots, that include complex relationships between seemingly arbitrary variables. One embodiment of this mechanism includes a visual "Data Pane". The Data Pane can be used by a system operator or user to provide a focus+context view into the data that greatly assists in the analysis and exploration of such data. The Data Pane is thus ideally suited to the analysis of two-dimensional data sets in which the number of data points far exceeds the number of pixels available per axis for any visual presentation of that data set, providing a graphical representations or overlay of the data that assists the user in quickly determining patterns among the data. Each data item is initially presented on the operator's visual display as a small object, perhaps as a single pixel. During a subsequent focusing operation the Data Pane is placed over an area of the display, the area of interest within the constraints of the Data Pane window is expanded, and the related data is presented to the user in an enhanced fashion.

The invention addresses the problem of providing a general presentation method for the data in non-focus regions by making use of graphical mapping techniques for presenting a Data Pane image representing an information data structure utilizing graphic images in the data cells in place of the non-graphical data in the original underlying source data or information data structure. This graphical mapping technique provides a powerful mechanism for visually inspecting patterns and trends in the underlying data.

Moreover, the graphical mapping technique of the method and system of the present invention is particularly effective for displaying Data Pane images that are otherwise too large to fit in the display area. The invention makes use of a graphical mapping technique for presenting a Data Pane image, representing an information data structure stored in memory, by utilizing graphic images of the non-graphical data in regions that are not of interest to the user while simultaneously providing a system user with efficient access to data in individual areas of interest within the workspace or data display window.

One of the important features of the Data Pane, as embodied in the invention, is the fusion of dynamic columns, as found in technologies such as the Table Lens, to the axes or to a portion of a two-dimensional displayed plot such as a scatter plot. As referred to herein these "Active Axes" allow the operator to directly manipulate or analyze arbitrary data types, and facilitate quick, easy, and intuitive focus+context drill-downs of data subsets. As such, Data Panes are particularly suitable for the analysis of large matrix data sets, where the number of data points far exceeds the number pixels available on each display axis. Data Panes are also particularly suitable for complex multi-attribute categorical data sets in which the data is widely or randomly distributed according to underlying, and perhaps non-linear, relationships.

Other embodiments of the invention provide enhanced functionality for use with the Data Pane. One such enhancement is a drill-down feature referred to herein as a "Scratching" mechanism. Scratching provides a means for users to interactively drill-down several orders of magnitude in an intuitive manner. Another interface technique referred to herein as "Bumping" is also introduced. Bumping allows the user to perform a visual difference between the plots of two data sets in a context-preserving manner by quickly moving the Data Pane in to, and out of, a data analysis area. The interactive data pane image mapping and display techniques provided by the invention are particularly effective for allowing a user to scratch, interrogate, or otherwise interact within the data pane in an intuitive, dynamic manner. The present invention requires little specialized skill by a system user beyond those easily acquired in using a typical application software such as a spreadsheet application. This technique takes the most advantage of human cognition and perception capabilities in providing data in a graphical form and permitting inspection of patterns and trends in a global context.

The invention also, in some embodiments, provides the Data Pane user with an interactive feature referred to herein as an "Active Slider". The active slider is an interactive presentation tool that resembles a cross between the brushing technique described in Rao & Card, and the dynamic/alpha sliders described in "Dynamic Queries for Information Exploration: An Implementation and Evaluation", Proceedings of the ACM SIGCHI Conference on Human Factors in Computing Systems, 1992, pp. 61–626, ACM, C. W. Ahlberg and B. Shneiderman; and, "AlphaSlider: A Compact and Rapid Selector", Proceedings of the ACM SIGCHI Conference on Human Factors in Computing Systems, 1994 pp 365–371, ACM, C. W. Ahlberg and B. Shneiderman, both of which are incorporated by reference herein. Active sliders allow the user to super-impose the data values of a third attribute into a plot of two other attributes, so as to analyze the interrelationships between the various data sets.

As described in detail herein, for purposes of a real-world illustration, Data Panes are described in the context of a specific example implementation that explores the relationship between various types of bibliographic data (for example cocitation data, bibliographic coupling, etc.) as found in bibliographic and database software systems, such as the Bookplex software system developed by Xerox, Inc. It will be evident to those skilled in the art that the invention, including the Data Pane and associated interaction features, may be equally used with other applications and in other environments.

BRIEF DESCRIPTION OF THE FIGURES

Figure 2:
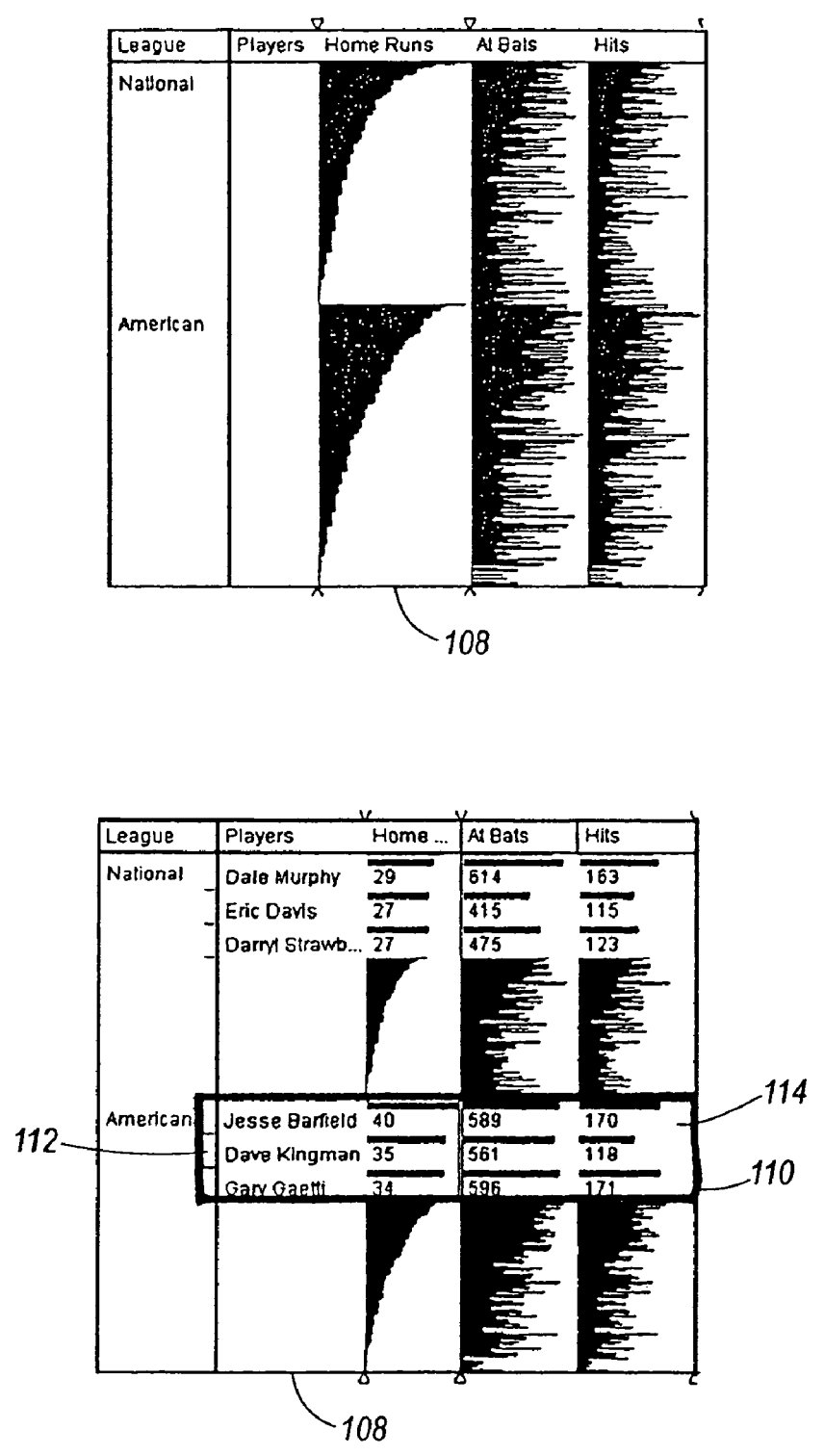

FIG. 2 is an illustration of an example of a table lens as used to display data from a table.

DETAILED DESCRIPTION

Figure 1:
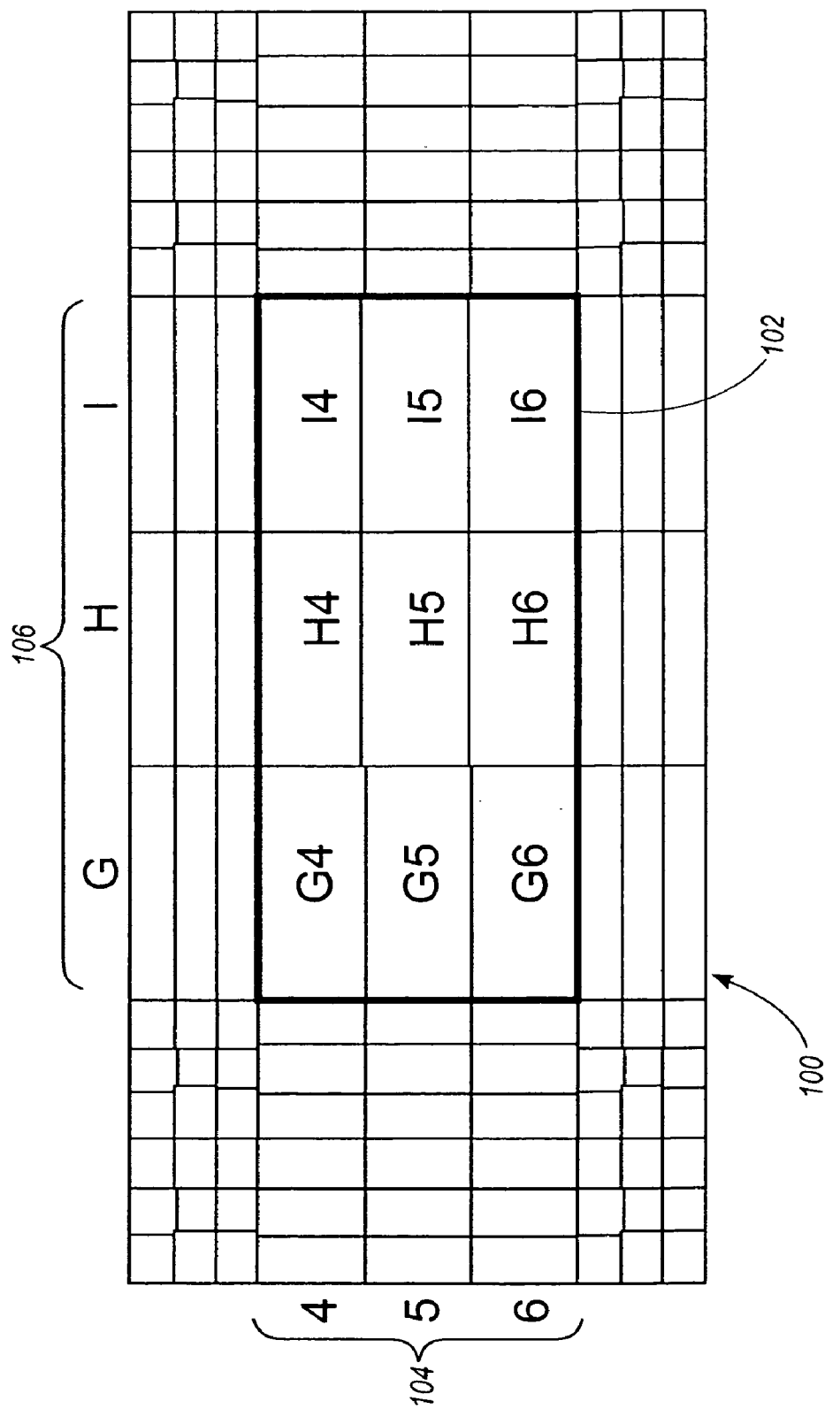
FIG. 1 is an illustration of a focus+context method for use with the invention.

The invention provides a system for graphically displaying, and for allowing users to interactively explore, complex data information or datasets, particularly with respect to detecting and analyzing any relationships within said data. One embodiment of the invention includes a visual tool, referred to herein as a "Data Pane". The Data Pane can be used by an operator (typically a computer user) to provide a focus (i.e. a local, often referred to as focal) plus context (i.e. global) or "focus+context" view into the data that greatly assists in the analysis and exploration of such data.

The following descriptions and representations of the invention are presented largely in terms of display images and symbolic representations of operations of data within the memory of the system. These descriptions and representations, which are algorithmic in nature, are used to convey the substance of the invention to others skilled in the art. An algorithm is here, and generally, conceived to be a self-consistent sequence of acts leading to a desired result. These acts are those requiring physical manipulations of physical quantities such as electrical or magnetic signals that are capable of being stored, transferred, combined, compared, and otherwise manipulated. These signals may be referred to by a variety of terms, including bits, values, elements, pixels, symbols, characters, terms, numbers, items, or the like. However, all of these terms and the additional terms defined below are convenient labels applied to appropriate physical quantities. The manipulations performed by such algorithms are often referred to in terms such as adding, comparing, or determining, which are commonly associated with mental operations performed by a human user. The capability of a human user is neither necessary nor desirable in the operations described herein which form part of the present invention. In some aspects of the present invention, however, the system operations are performed in response to operation request signals or user instructions initiated or generated by a human user. In addition, the algorithmic descriptions presented herein of the acts of the present invention for operating a system are not inherently related to any particular processor, machine, or other apparatus, but can be performed on any general purpose digital computer, machine, or other similar device configured as described below and in the claims.

The following terms have the meanings indicated throughout this specification and in the claims. Some of the following definitions are taken from U.S. Pat. Nos. 5,632, 009, 5,880,742, 5,883,635 and 6,085,202, hereinafter referred to collectively as Rao & Card, and incorporated herein.

The term "data" refers herein to physical signals that indicate or include information. The term "data" includes data existing in any physical form, and includes data that are transitory or are being stored or transmitted. For example, data could exist as electromagnetic or other transmitted signals or as signals stored in electronic, magnetic, or other form. "Data information" and "data sets" are used to refer to collections or sets of data that may or may not have any interrelations.

An "item of data" or a "data item" is a quantity of data that a processor can access or otherwise operate on as a unit. Data items can be combined into a "data structure". A "data structure" is any combination of interrelated data. A data structure may also include other data structures. An "array of data" or "data array" or "array" is a combination of data items that can be mapped into a logical array.

A "processor-controlled machine", "processor-controlled system", "processor", or "computer" is any machine, component or system that can process data, and may include one or more central processing units or other processing components. Any two components of a machine or system are "connected" when there is a combination of circuitry that can transfer data from one of the components to the other. The component from which the data is transferred "provides" the data, and the other component "receives" the data. For example, two processing units are "connected" by any combination of connections between them that permits transfer of data from one of the processing units to the other. A processor "accesses" an item of data in memory by any operation that retrieves or modifies the item, such as by reading or writing a location in memory that includes the item. A processor can be "connected for accessing" an item of data by any combination of connections with local or remote memory or input/output devices that permits the processor to access the item.

A processor "uses" data in performing an operation when the result of the operation depends on the value of the data. An "instruction" is an item of data that a processor can use to determine its own operation. A processor "executes" a set of instructions when it uses the instructions to determine its operations.

"Memory" is any component, combination of components, circuitry, or system used to store data, and may include local and remote memory and input/output devices. An example of memory is a storage medium access device, together with a data storage medium that it can access. Memory can be transient, semi-permanent, or permanent in nature, and the contents of said memory may be either retained or not retained when the power is removed from the device.

A "data storage medium" or "storage medium" is a physical medium that can store data. Examples of data storage media include magnetic media such as floppy disks and PCMCIA memory cards, optical media such as CD-ROMs, and semiconductor media such as semiconductor ROMs and RAMs. As used herein, "storage medium" covers one or more distinct units of a medium that together store a body of data. A "storage medium access device" is a device with circuitry that can access data on a data storage medium.

An item of data "indicates" a thing, an event, or a characteristic when the item has a value that depends on the existence or occurrence of the thing, event, or characteristic or on a measure of the thing, event, or characteristic. When an item of data can indicate one of a number of possible alternatives, the item of data has one of a number of "values".

An "image" is a pattern of light. An image may include characters, words, and text as well as other features such as graphics. An "image output device" is a device that can provide output defining an image. A "display" or "display device" is an image output device that provides information in a visible, human viewable form. A display may, for example, include a cathode ray tube; an array of light emitting, reflecting, or absorbing elements; a device or structure that presents marks on paper or another medium; or any other device or structure capable of defining an image in a visible form. To "present an image" on a display is to operate the display so that a viewer can perceive the image. A "display area" is the portion of the display in which an image is presented or the medium which receives an image. The display area may include one or more "workspaces" or "windows" wherein display features appear to have respective relative positions within the workspace. "Presenting" a workspace or window in the display area produces the human perceptions of the display features in respective positions relative to each other. Strictly speaking, a window is just one example of a workspace, while other types of graphically displayed workspaces that don't conform to the traditional notion of a window can be used, such as for example, a magnifying glass device, or a lens device.

Data "defines" an image when the data includes sufficient information to directly produce the image, such as by presenting the image on a display. Data defining an image is referred to herein as an "image definition" or "image definition data". For example, a two-dimensional array is an image definition that can define all or any part of an image, with each item of data in the array providing a value indicating the color of a respective location of the image.

Each image location is typically called a "pixel", and the two-dimensional array of data is typically called "image pixel data" or an "image pixel data structure". While image pixel data is the most common type of image definition data, other image definitions, such as vector list data, are intended to be included within the meaning of data defining an image.

The term "display feature" refers to any human perception produced by a display in a processor-controlled machine or system. A "display object" or "object" is a display feature that is perceptible as a coherent unity. A "shape" is a display object hat has a distinguishable and perceptible outline; for example, a circular display object is a shape. A shape having a bounded area may be called a "region". An image "includes" a display feature or object if presentation of the image can produce perception of the feature or object. Similarly, a display object "includes" a display feature if presentation of the display object can produce perception of the display feature. A display feature or display object is not limited to a strictly pictorial representation. An image may include "character display features". When presented in image form in the display area of a display device, "characters" may be referred to as "character display features". The term "character" as used herein indicates a discrete element that appears in a written or printed form of a particular language, and is a symbolic representation of information directly perceivable by a human who understands the particular language, and is often referred to generally as "text".

In one embodiment of the invention the Data Pane image (or simply the Data Pane) generally includes a plurality of row identifier regions, a plurality of column identifier regions, a plurality of cell regions and one or more active column widgets fused to the Data Pane axes. The cell regions are arranged in the Data Pane image in row and column order such that the width of the cell region in anyone column is the same as the width of the column's respective column identifier region; the height of the cell region in any one row is the same as the height of the row's respective row identifier region; the range of X locations of a cell region in the display area is the same as the range of X locations of the cell region's respective column identifier region; and the range of Y locations of a cell region in the display area is the same as the range of Y locations of the cell region's respective row identifier region in the display area.

Figure 3:
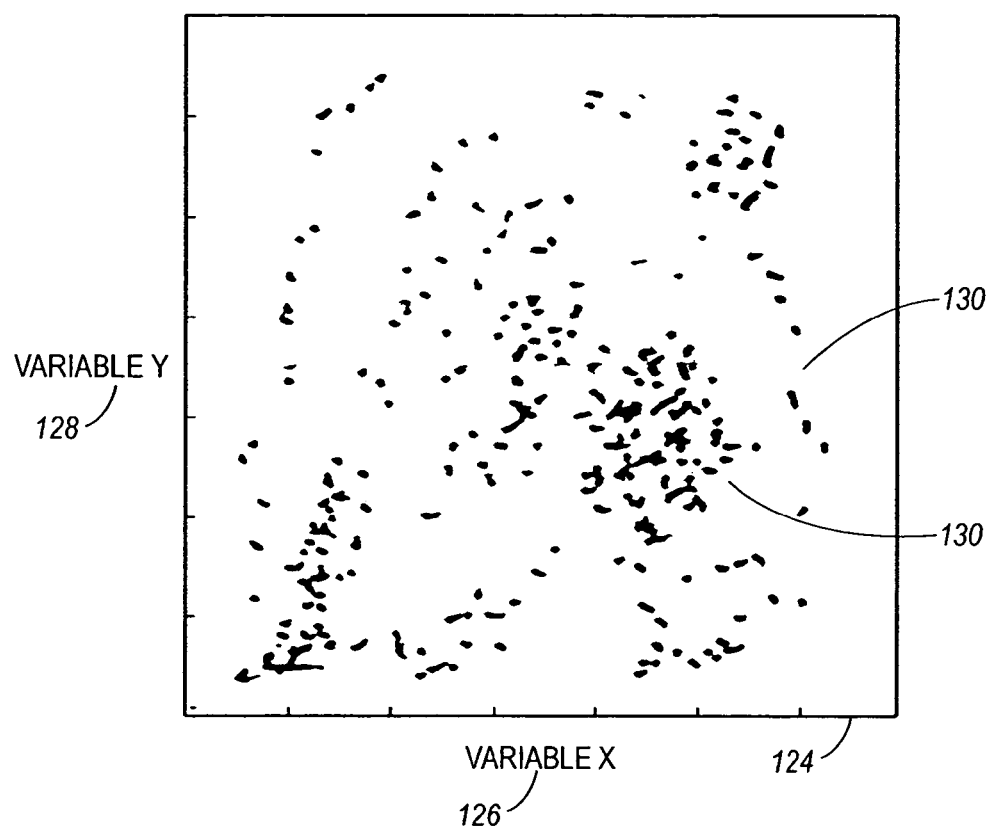
FIG. 3 is an illustration of a sample data set for use with the invention.

FIG. 3 shows an illustration of a typical data set that may be analyzed using the invention. In this example, a two-dimensional plot 124 is shown, wherein the data points 130 represent the results of plotting two data item a tributes or variables, in this case a first data item variable X (126) and a second data item variable Y (128). Each data item 130 is initially presented on the operator's visual display as a small object, perhaps as a single pixel. During a subsequent focusing operation the Data Pane of the invention is placed over the entire data set or plot, or merely an area of the display, an area of interest within the constraints of the Data Pane window is selected, or expanded, and additional descriptive or data information, the results of data operations, or any related data or data items is presented to the user.

A common characteristic of processor-controlled systems operated by the method of the present invention is a mapping between the data stored as source data within the system, or retrieved from a data storage device by the system, and the display features displayed as images by the system. As referred to herein the "source data" is the data to be analyzed. A display feature represents a set or subset of source data when the display feature can be mapped to one or more items or sets of items, of data within the body of source data. For example, in a Data Pane image, algorithms can be used to map between the underlying source data, and any displayed features, so that the character display features that are presented in the image as an entry in a cell region directly represent, and are mapped to, a corresponding item of source data. Source data is typically stored in a data structure such as a data array, in the memory of the system.

The character display features in a Data Pane image directly represent an item of data when each character display feature is a one-to-one mapping of an item of data, or a portion of an item of data, having a character data value to which it can be mapped. In this case the character display features are a direct representation of the character data values. Thus, whereas, a conventional application program might produce a table image including character display features in the cell regions that directly represent the alphanumeric information included in the underlying data structure, the method of the present invention can produce a "graphical display object" for display in the Data Pane image. As used herein, a graphical display object is considered an "indirect" representation of the information included in the underlying data structure. Generally, but not necessarily, a graphical display object will include display features other than character display features when the underlying data from which the graphical display object is mapped contains character information.

Examples of graphical display objects include, but are not limited to, circular, rectangular, and triangular shapes with or without interior fill color, lines of various thicknesses, horizontal or vertical colored bars, combinations of such shapes and lines, and features perceivable as images of physical objects. Thus, a graphical display object is a pictorial representation of information. There are times when the underlying data is effectively indirectly represented by a graphical display object that includes character display features. For example, when a data item is a composite object, a single character display feature may indirectly represent the complex data structure in the focus region of the Data Pane image. When used in this sense, character display features are used as graphical elements in an essentially graphical image. Rao & Card describes in further detail a variety of the graphical objects and elements that can be used with the invention.

The mapping of one or more items of data, as specified in the underlying source data, to a display feature or object is performed by an operation. As used herein, an operation defines a set of instructions accessible and executable by the processor in a system, defining the mapping relationship or function between one or more items of data and a display feature or object in an image. An operation generates a display feature or object in an image when the operation begins. Performing the operation results in the data defining the display feature or the object in the image. When the operation uses items of data as input in order to produce data defining a display feature or object in an image, the display feature or object is said to have been produced from those input data items.

One way of categorizing a particular operation is to distinguish it by the type of data the operation uses as input. In accordance with one embodiment of the present invention the method used is a "model-based operation", in which "model data" is used as input, and image definition data defining an image is generated as output. A model-based operation thus maps one or more information data items in an information data structure to a display feature included in the resulting image produced by the operation. An information data structure is not limited to a combination of data items physically located in a substantially contiguous part of a system's memory, but may include individual model data items diversely located in memory or memories that are accessible by the processor when it performs the operation. A model-based operation is thus distinguishable from a simpler image-based operation that maps one or more image definition data items, such as pixels, to a display feature included in the image produced by the operation. The present invention is described in terms of model-based operations but aspects of the invention can be equally used with image-based operations.

Additional details describing the above mechanisms and definitions are included in U.S. Pat. Nos. 5,632,009, 5,880, 742, 5,883,635 and 6,085,202, hereinafter referred to collectively as Rao and Card.

System Layout

Figure 4:
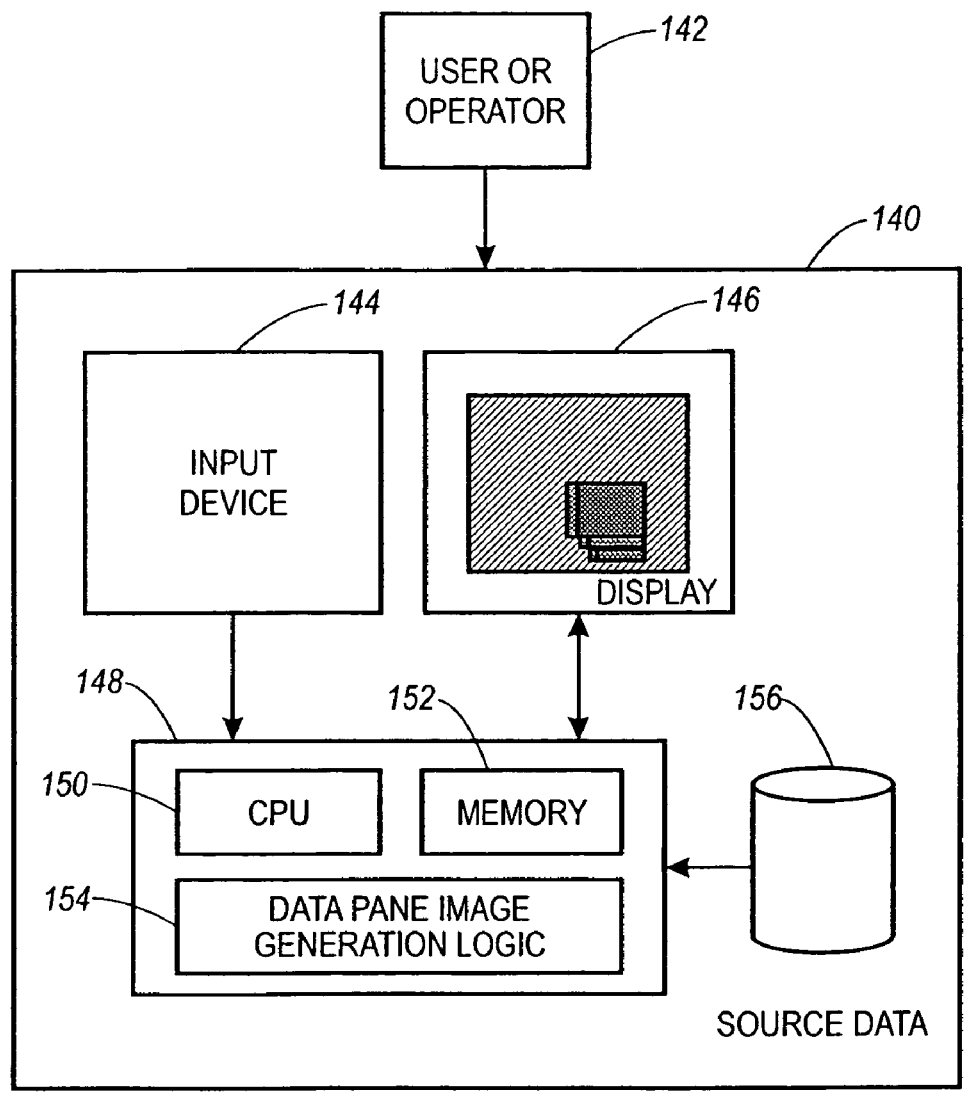
FIG. 4 is a schematic of an embodiment of a data analysis system incorporating the invention.

FIG. 4 shows one embodiment of a system that can be used to perform the invention. As shown in FIG. 4, the data analysis system 140 includes a central processing and logic unit 148. This central processing and logic unit in turn comprise a CPU processor 150, a memory 152 for storage both of data, image objects, and logical operators, and a Data Pane image generation logic 154. The Data Pane image generation logic includes algorithms, and routines, for defining operations or otherwise mapping the source data 156 into graphical objects for later display on the screen a display 146. An input device 144, such as a mouse, keyboard, trackball or similar wired or wireless pointer mechanism, allows a user or operator 142 to supply input instructions to the central processing and logic unit 148, and the operations and processor-readable instructions that run thereon. The input instructions are used as input into the mapping operations that map the source data onto graphical display objects.

Data Pane

A primary purpose of the Data Pane is to facilitate the ease of user interaction in working with or analyzing large datasets, and in a particular embodiment, to understanding the relationships between bibliometric matrices. To do this, several data visualization concepts are adapted from existing visualization widgets such as the Table Lens described in Rao & Card. The invention also makes use of interaction features such as Dynamic Queries, Alpha Sliders, and Brushing, while introducing new techniques such as Active Axes, Scratching, Bumping, and Attribute Sliders. The illustrations used as examples herein are mock-ups, and are simulated to represent similar plots to those presented in the book Readings in Information Visualization: Using Vision to Think (Morgan Kaufmann Series in Interactive Technologies) by Stuart K. Card, Jock D. MacKinlay (Editor), and Ben Shneiderman (Editor), Morgan Kaufmann Publishers, Jan. 25, 1999, ISBN: 1558605339., incorporated herein by reference. In some bibliometric data analysis cases, the data consists of a set of bibliographic citations, where each citation has the following primary attributes: authors, year of publication, title, and type of publication (conference, journal, etc.). Active Axes employ the "column widget" concept as found in the Table Lens described in Rao & Card to form the axes of a graphical plot. Each axis is represented as a column, whose data are displayed visually as bars of varying width, length, and color. Instead of displaying numbers or text that describe the range of values being plotted, Active Axes use graphical display objects such as horizontal or vertical bars to visually represent the data values along with optional text descriptions. The bars are generated by mapping operations, and each bar represents a plotted data value, a group of data values or a result of a data modeling process applied to said data values. One advantage of this approach is that it facilitates the plotting of large data sets and non-numeric data in a meaningful manner that is of more use to the human operator.

Figure 5:
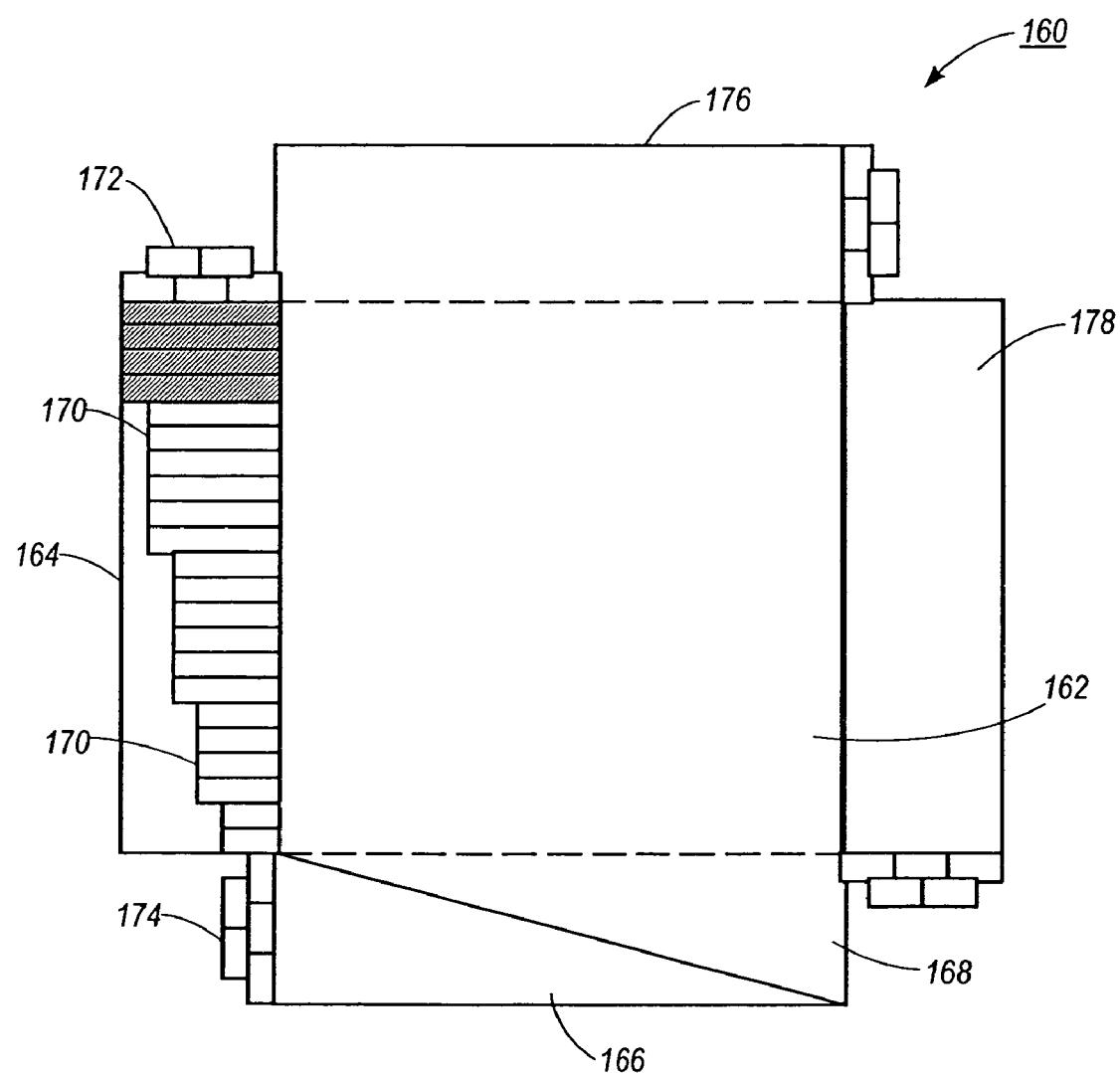
FIG. 5 is an illustration of a Data Pane in accordance with an embodiment of the invention.

FIG. 5 shows an illustration of a prototypical Data Pane in accordance with an embodiment of the invention. The Data Pane is created as an image for display on the user's screen. As shown in FIG. 5 the Data Pane image 160 includes a number of Active Axes 164, 166 along the left hand side and bottom of the Data Pane image respectively. A number of Scratch pad axes 176, 178 are included along the right hand side and top of the Data Pane image. The center of the Data Pane image 162 acts as a viewing area for the data to be analyzed. Selected variables 170 appear along one or more of the Active Axes 164 or 166. Each axis is represented as a column whose data is displayed visually as horizontal or vertical bars of varying width, length or color. Other graphical elements could be used in accordance with other embodiments of the invention. The variety of graphical elements that can be used with the invention are described in further detail in Rao & Card. In this example, the Active Axes use horizontal bars to visually represent the data values, together with optional text descriptions. Each axes may display discreet or continuous variables. In the example shown in FIG. 5, one of the axis 164 includes discreet variables 170 while the other axis 166 includes a monotonically increasing variable 168. Other combinations of such discreet and continuous variables may be used in accordance with the invention. The Active Axis is as such tied to the data item variable it represents. An action or interaction upon the Active Axis alters the display of that data item variable in that dimension. The Active Axis is described in further detail below. A plurality of column widgets 172, 174 allow the user or operator to select from a plurality of different variables to be plotted or analyzed. The Scratch pad areas 176 and 178 allow variables from the Active Axes to be dragged onto the Scratch pad and recorded or stored for later retrieval and use.

Figure 6:
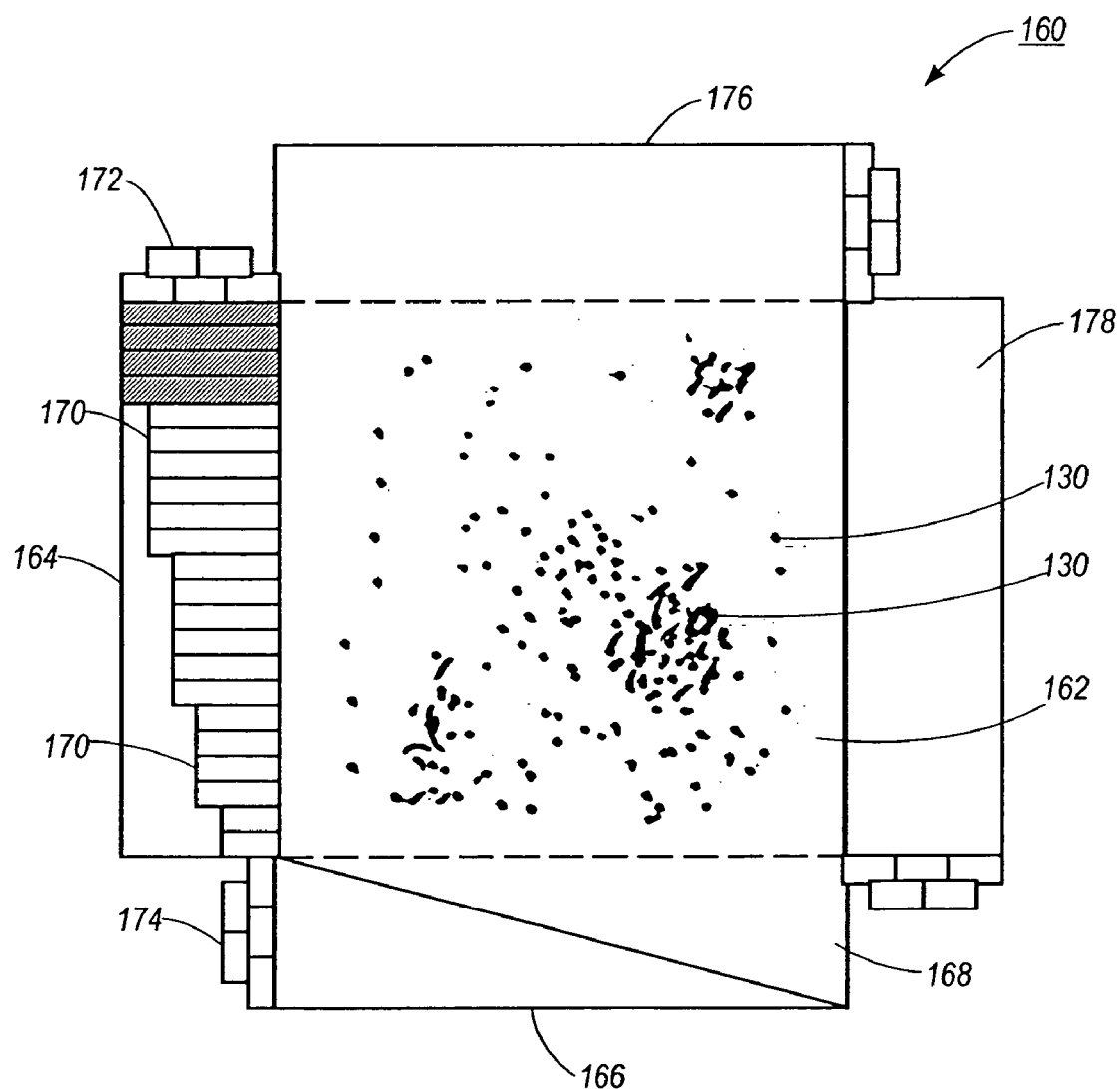
FIG. 6 is an illustration of a Data Pane being used with the data set of FIG. 3 in accordance with an embodiment of the invention.
Figure 7:
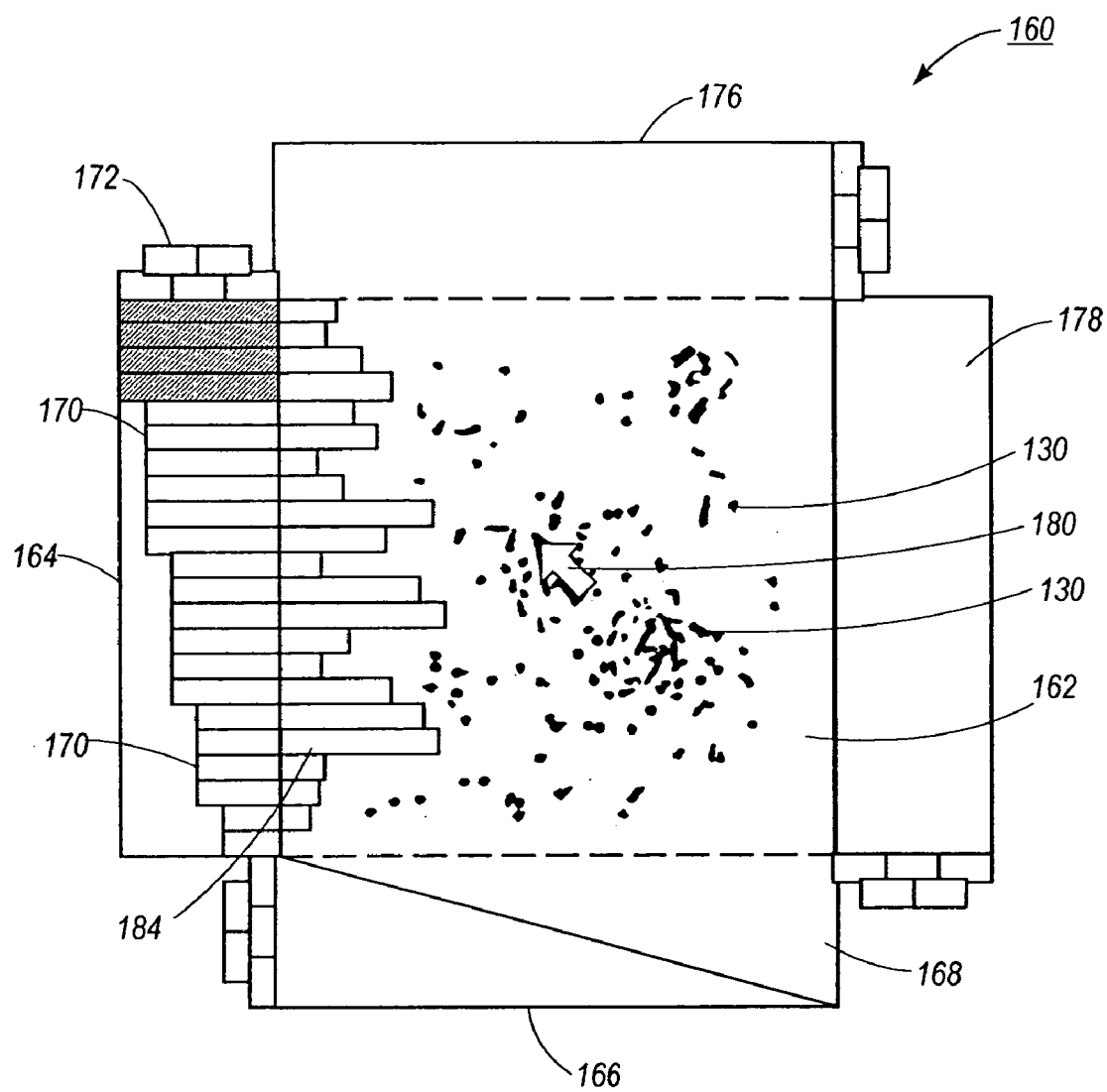
FIG. 7 is an illustration of a Data Pane being used to generate display objects from the data set of FIG. 3 in accordance with an embodiment of the invention.
Figure 8:
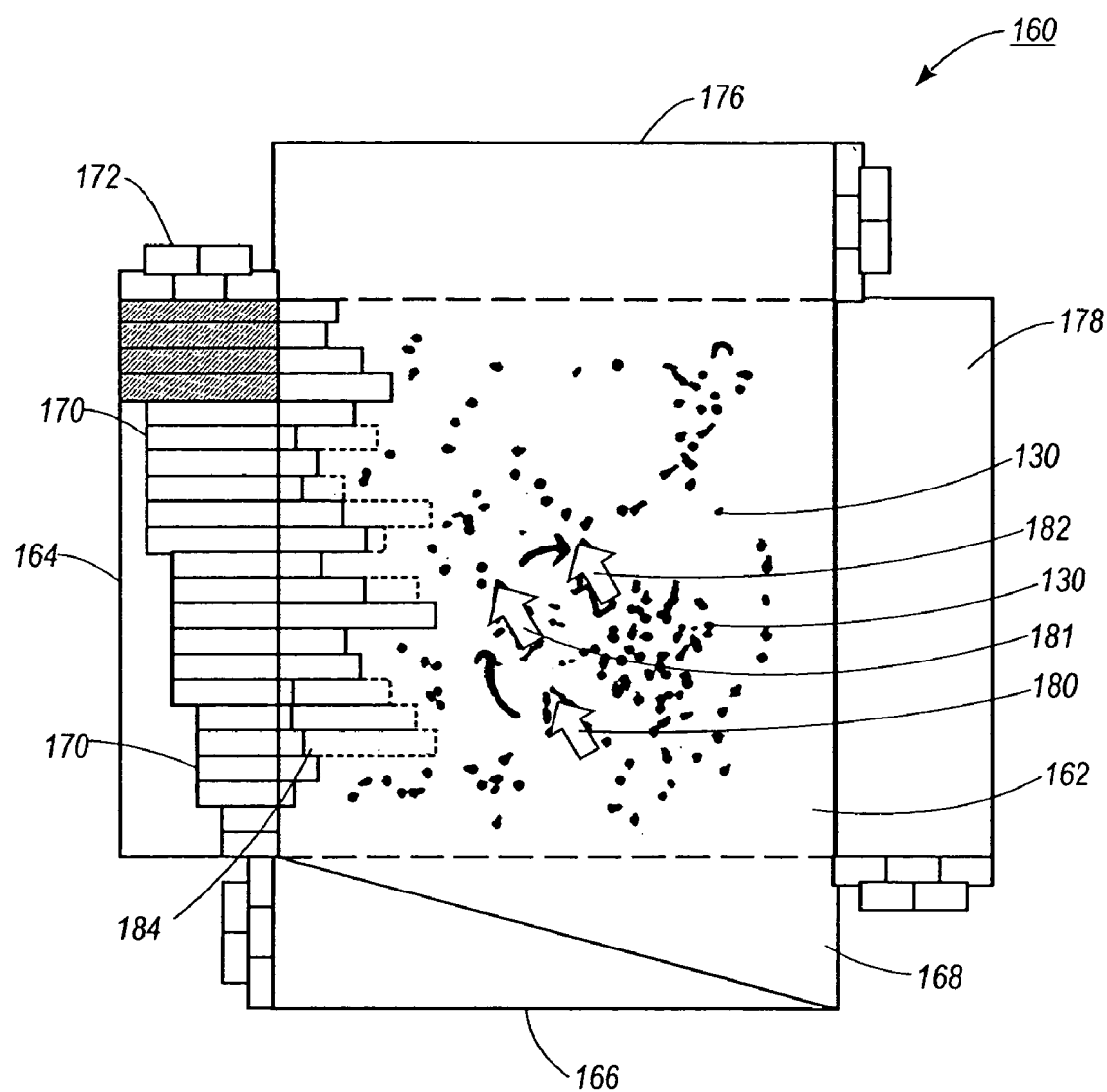
FIG. 8 is an illustration of a Data Pane being used to examine the data set of FIG. 3 in accordance with an embodiment of the invention.

The operation of the Data Pane as it is used with a set of two-dimensional data such as a scatter plot or contour plot is illustrated in FIGS. 6, 7, and 8. As shown in FIG. 6, the Data Pane image may be placed or displayed upon an area of the screen, and hence an area of data 130, to be analyzed. Similarly, the Data Pane image may be displayed first and data retrieved into the display area. As shown in FIG. 7, when the Data Pane image 192 is placed on the screen and activated, for example by clicking with a mouse cursor 180 within the Data Pane workspace, the underlying data is retrieved, parsed, and mapped through operations to a set of one or more display objects 184. A graphical representation containing such display objects 184 is displayed in the active area of the Data Pane image. As shown in FIG. 7, the graphical representation of the source data is shown as a series of horizontal bar display elements 184. Other display objects can be used within the spirit and scope of the invention. In accordance with this embodiment the focus region of the Data Pane image may be moved around the screen to analyze data within the display area. As shown in FIG. 8, as the cursor is moved from a first position 181 to a second position 182, the focus area is changed from a first position to a second position, and the display object 184 representation changed accordingly. The Data Pane may also be resized or reshaped to include different focus areas or areas of underlying data. A useful implementation of the Data Pane image is one in which the Active Axes are fused to the plot of the data plot itself, in which the Data Pane image thus encompasses the entire window of data. To investigate the underlying data the user or operator may move their mouse cursor within the Data Pane visual area or workspace to reflect the underlying data in that particular area.

Figure 9:
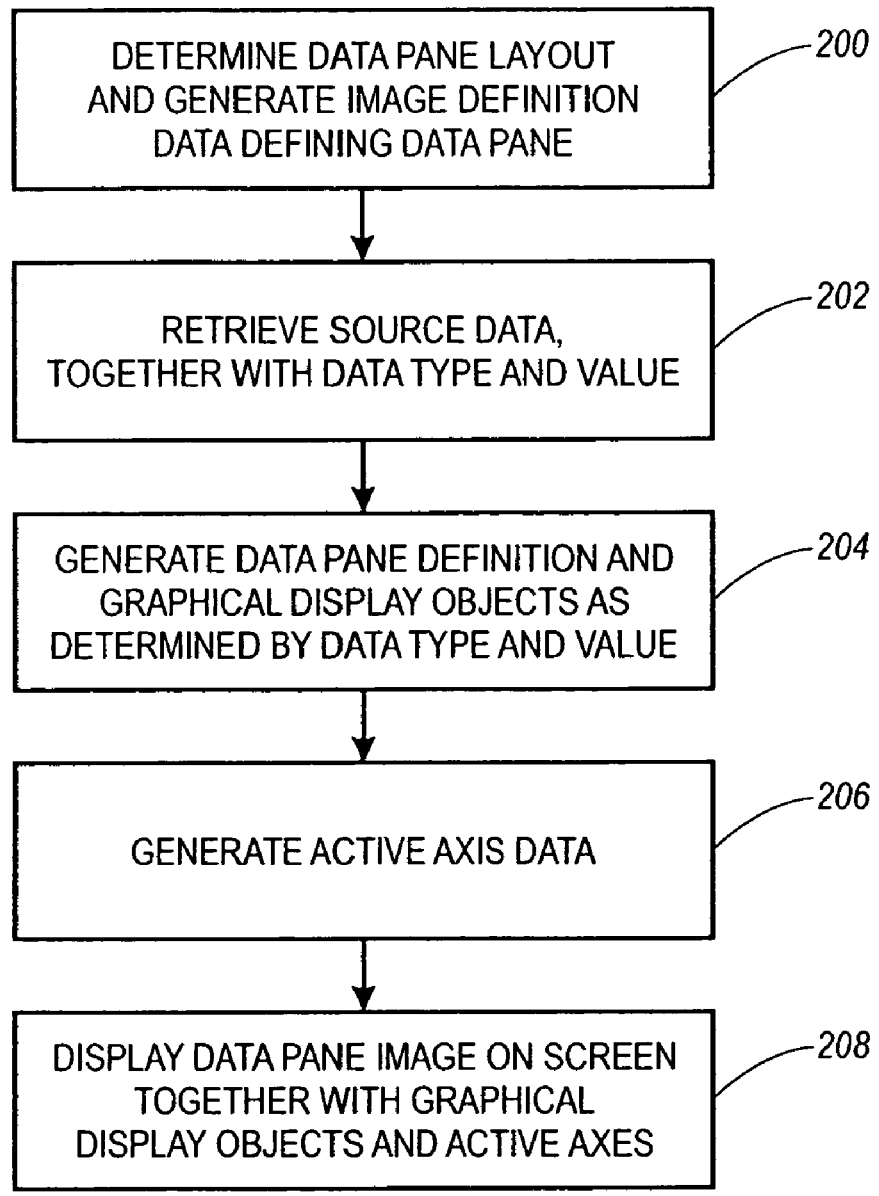
FIG. 9 is a flowchart of a method of displaying a Data Pane in accordance with an embodiment of the invention.

FIG. 9 illustrates a method to display the Data Pane image on the screen together with the graphical display objects and Active Axes. As shown in FIG. 9, in step 200 the Data Pane layout is determined and an image definition data is generated defining the Data Pane image. The next step 202 in the process is to retrieve the underlying source data together with any associated data type and value. In step 204 the Data Pane definition is generated and any graphical display objects determined by the data type and value are selected for display. In step 206 the Active Axes data is generated, and in step 208 the Data Pane image is displayed on the user or operator's screen, together with graphical display objects and Active Axes.

Figure 10:
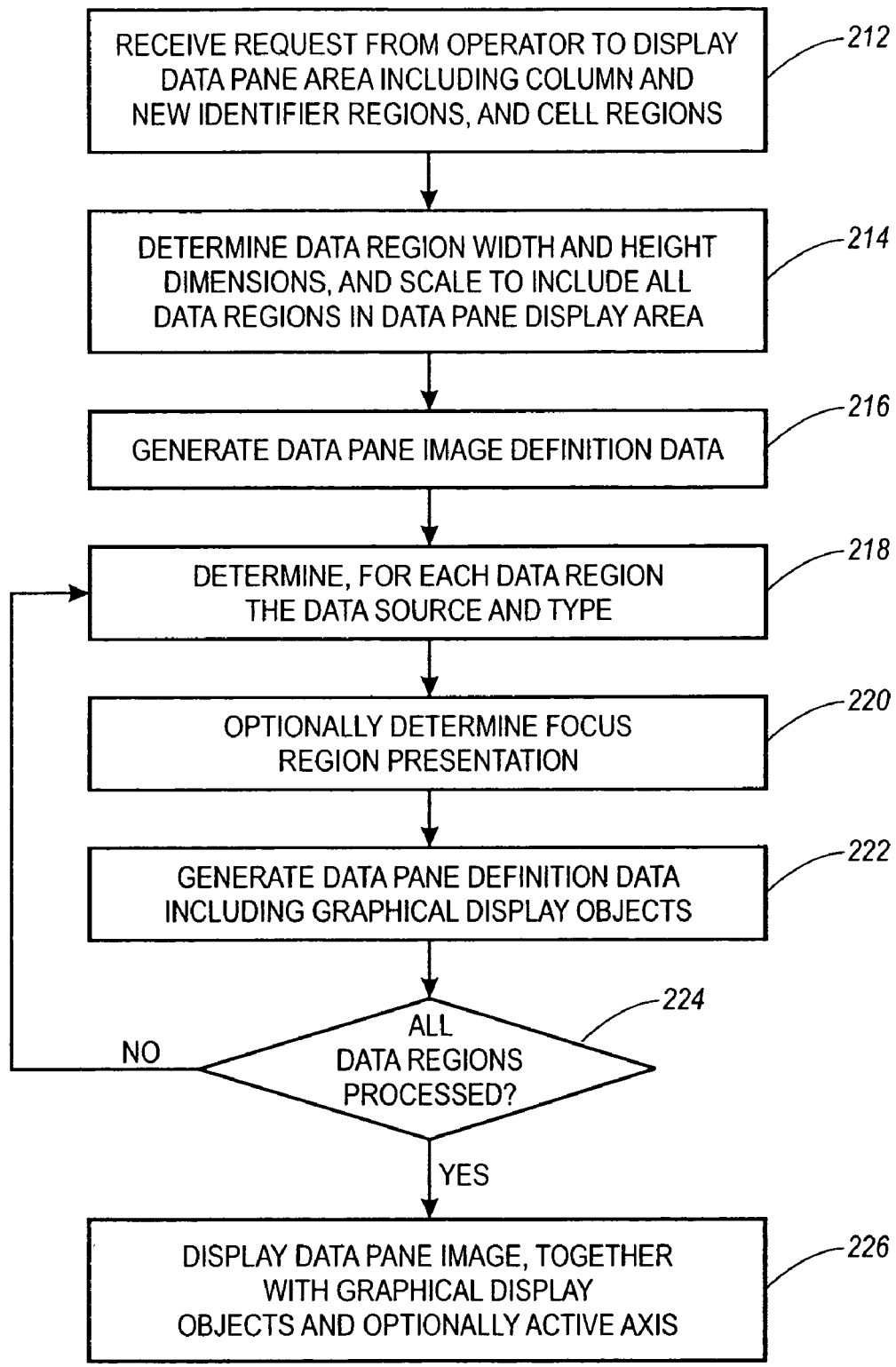
FIG. 10 is a flowchart of a method of using a Data Pane to examine data in accordance with an embodiment of the invention.

FIG. 10 illustrates a method to display the Data Pane image together with the graphical display objects, and optionally one or more Active Axes. In step 212 the system receives from the operator or user a request to display the Data Pane image or Data Pane image area including the identified data regions. The first step 214 in displaying the image is to determine the data region width and height dimensions and scale them appropriately to include all the data regions in the Data Pane display area. In step 216 the Data Pane image definition data is generated. The method then uses a loop to determine for each focus region the data source and type. The first step in this loop is to determine presentation format (step 220), if available. A presentation format allows the system to apply different presentation formats for different data sets and types of data, by associating different presentation formats with different data types. The user can select which presentation format is to be used. The next step is to generate the Data Pane definition data including any graphical display objects to be displayed for this particular data. If all data regions are completed then the Data Pane image is displayed together with any graphical display objects and optionally any Active Axes. Otherwise the process loops back to determine for the next data region the data source and type and display it accordingly.

Figure 11:
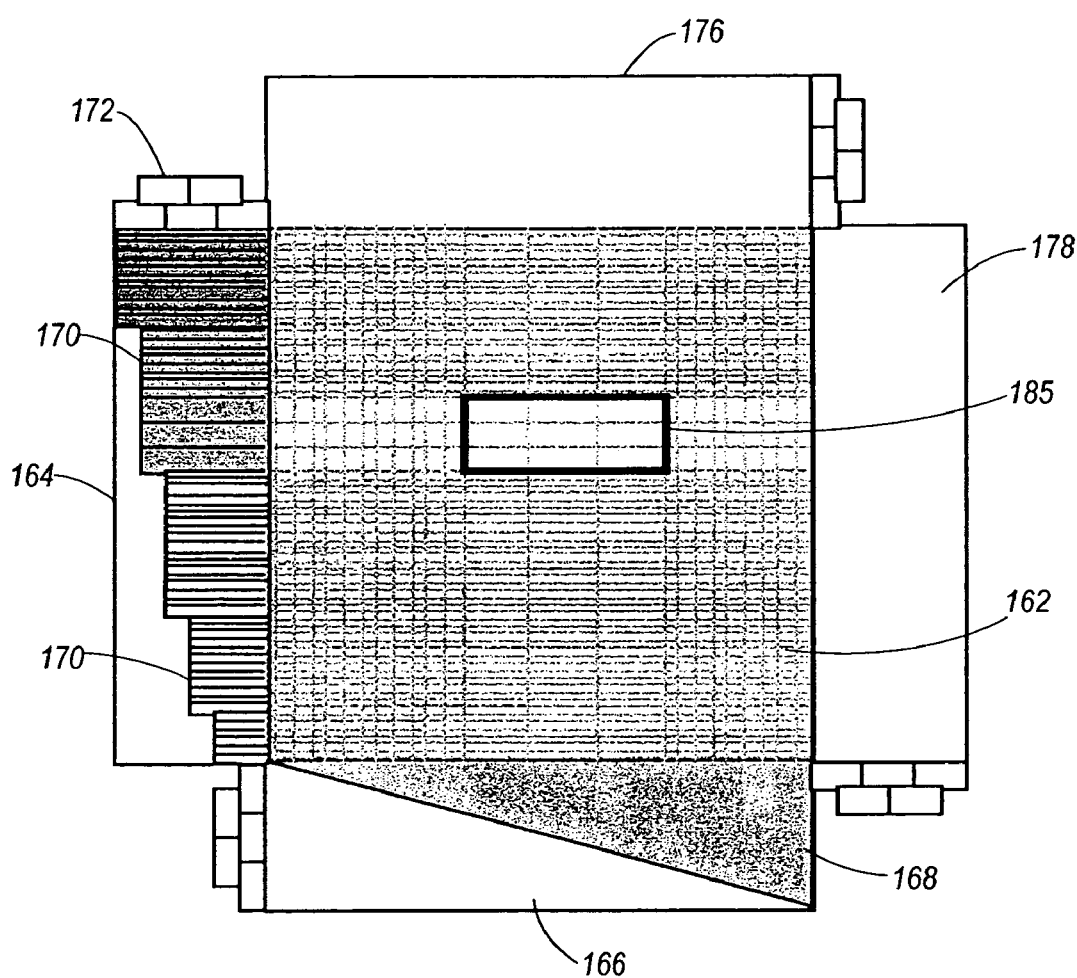
FIG. 11 is an illustration of a Data Pane with a focus region in accordance with an embodiment of the invention.

FIG. 11 illustrates a more detailed view of a Data Pane image in accordance with one embodiment of the invention that illustrates how the Active Axes are used to provide a focus+context mechanism that can then be used to drill down into data and display accordingly more relevant information. As shown in FIG. 11, a Data Pane image 160 includes a Data Pane image area 168, as shown in the earlier examples described above. FIG. 11 more clearly illustrates the ability of a user to focus in on an area of the Data Pane using a focus+context operation. As shown, the Data Pane 160 is comprised of columns 242 and rows 248. The lines denoting the rows and columns will typically not be visible to the computer user or operator, but are instead hidden from view. Focusing can be performed in a variety of different ways, depending on the interaction technique employed by the user. The horizontal and vertical lines of FIG. 11 indicate discrete data item variable "bins". As mentioned above, the discrete variables designated within each Active Axis are tied to the variables in each multi-dimensional data item in the Active Axis dimension. Interacting with the Active Axis also results in an interaction with the dimensions of the data bin in that same dimension. In the example shown in FIG. 11, using a cursor to stretch a portion of the Active Axis along one dimension, for example, in a vertical (Y) direction results in the data bins also being stretched in that direction. More data items or points are then visible in the larger bin, and the user can focus down further into the resulting plot. Similarly, the user can stretch the Active Axes dimensions at the same time to produce a magnifying-glass type effect.

The way in which the cursor action operates upon the display area depends on the specific implementation. In the embodiment described above, the cursor is used primarily to stretch or otherwise interact with the Active Axis. In another embodiment, a pre-defined focus area 185 can moved about the screen. In other embodiments, moving the cursor in certain ways (such as Brushing and Scratching, described below) causes the focus region 185 to be stretched by stretching the row and column regions that define its limits. The action of moving the mouse cursor still acts upon the rows and columns, regardless of whether the lines are visible. In each embodiment, actions by the user can stretch rows and/or columns to drill down into the data and display accordingly more important information. This information is used as input into a mapping operation to generate additional data-related information in the workspace, in the form of enhanced graphical display objects or alphanumeric text data.

Figure 12:
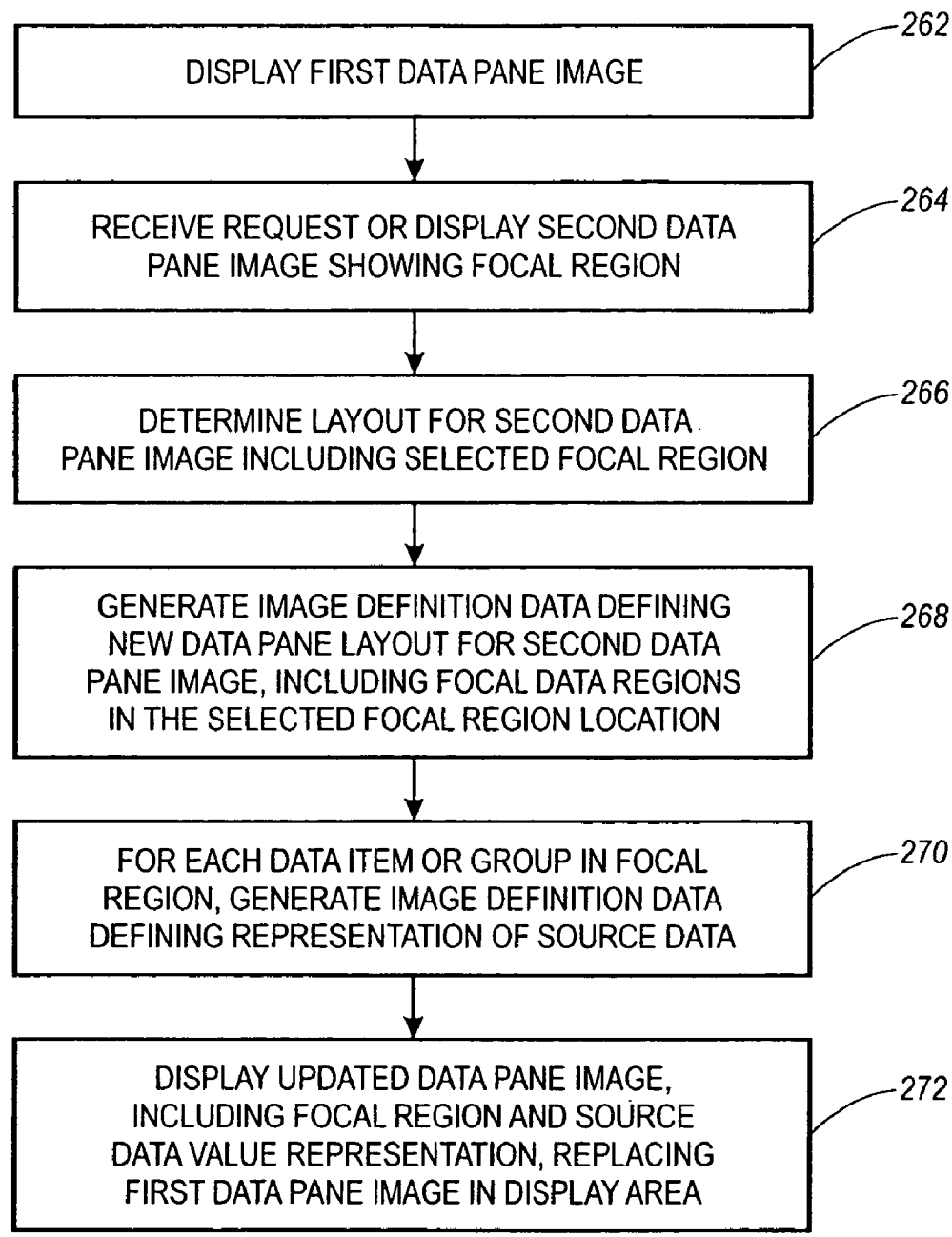
FIG. 12 is a flowchart of a method of using of a Data Pane with focus region in accordance with an embodiment of the invention.

FIG. 12 illustrates a method to display an updated Data Pane image which includes the focus+context view. As shown in FIG. 12, the first step in the process is to display a first Data Pane image. In step 264 a request is received form the operator to display a second Data Pane image that shows the focus region. The method first determines the layout for the second Data Pane image that includes the selected focus region. In step 268 the image definition data defining the new Data Pane layout is generated. This new Data Pane image layout includes the focus cell regions for the selected focus region. In step 270, for each cell within the focus region image definition data is generated which defines a representation of the underlying source data. This updated Data Pane image is then displayed in step 272 and includes the focus regions selected by the operator.

Interaction Techniques

Several interaction techniques can be used together with the Data Pane that enhance the use of focus+context distortions. Focus+context techniques distort the layout of data items based upon their degree-of-interest. For example, as shown in FIG. 1 and described above, the focus+context mechanism is used to create the basic distortions used by the Table Lens as well as other focus+context interfaces. In FIG. 1, rows 4–6 have been enlarged along with columns G-I yielding the focus area G4-16. For column widgets, the focus area and corresponding distortion occur only along one dimension (i.e. rows or columns). Three main interaction techniques are used to cause distortions, described in detail in Rao & Card: zooming, adjusting, and sliding. With zooming, the size of the focus area changes while preserving the amount of space allocated to items within the focus area. Adjusting changes the amount of contents shown in a fixed focus area (analogous to stretching and shrinking). Sliding changes the location of the focus area.

Scratching

An enhanced interaction technique provided by the invention is referred to herein as "Scratching". Scratching is a technique to quickly adjust the granularity of contents shown within a focus area. As mentioned above, in many common applications the number of pixels available on a screen to display very large datasets is limited, resulting in a pixel often representing more than one data item or value. Each pixel effectively represents a bin of data values, although most plotting or data display systems simply overwrite each pixel for each data value. Scratching enables the user to quickly drill down into a particular area of interest. In one embodiment this is accomplished by moving the mouse back and forth in the desired areas while keeping the mouse button depressed. Unlike the Table Lens where cells can either be expanded or collapsed visually, the range of space to allocate for different levels of granularity for numeric data is continuous and quite large. Adjusting a one million by one million matrix plot can show the focus data anywhere from a single value per entry to aggregate values spanning several orders of magnitude. By Scratching, a user can adjust the display to show the varying ranges of granularity in an easy, direct manner.

The selection of granularity can be controlled in a variety of ways. The most simple method increases the granularity of the data in an linear manner commensurate with the duration of holding down the mouse button. In this method, the distorted range is kept constant, while the level of detail is increased. One problem with this approach is that the system must automatically determine which area to continue to expand.

A more sophisticated method uses the location of the cursor to determine which range of values if expanded. By Scratching the mouse on the top portions of the distorted range, the user is able to drill down on the values that occur right next to non-distortion. Other cues that can be exploited to control Scratching include normal mouse interactions like the frequency of back and forth motions, the range of the top and bottom most Scratches, the dwell time over an item of interest, etc. The operation of Scratching can be easily reversed by clicking on the focus region.

Figure 13:
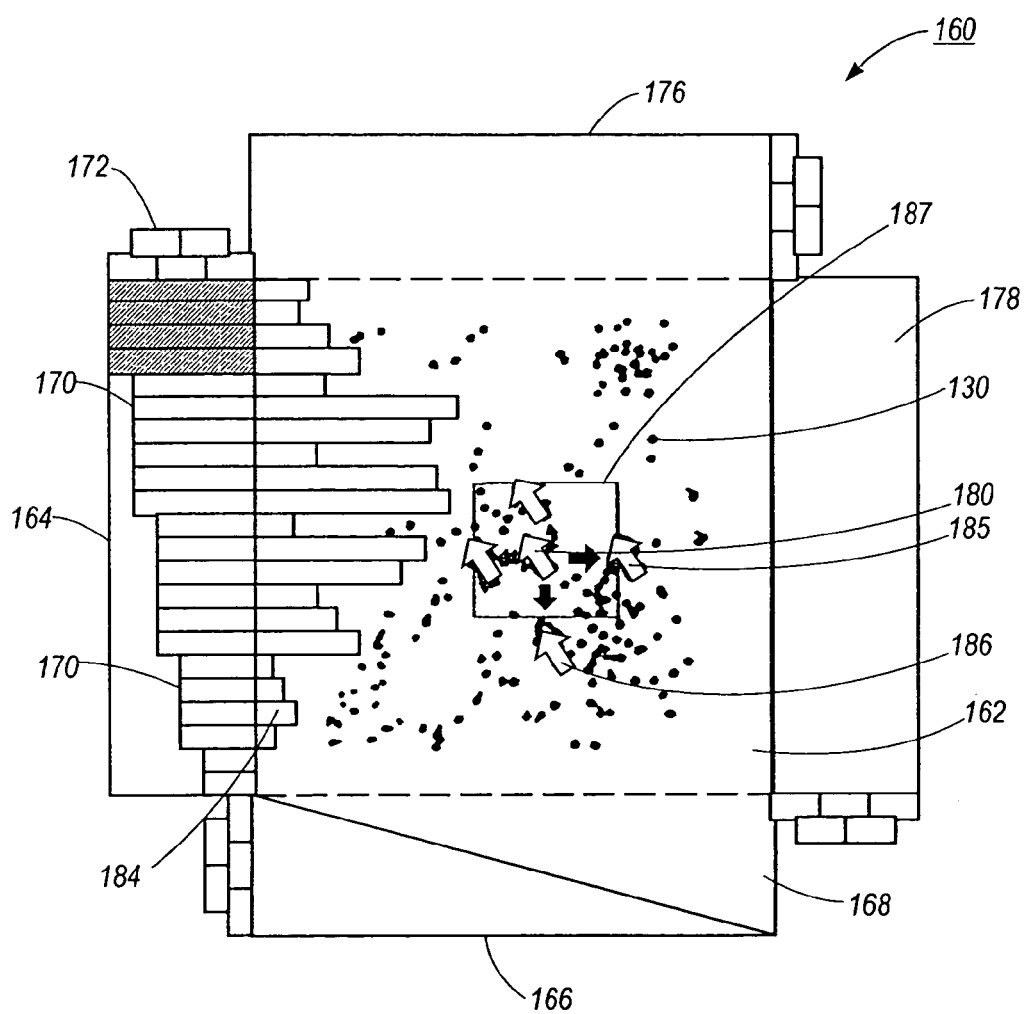
FIG. 13 is an illustration of a Scratching technique for use with the Data Pane.

FIG. 13 illustrates the use of a Scratching technique that can be used with the invention. As shown in FIG. 13 a Data Pane image is superimposed upon a two-dimensional data plot. It will be evident to one of skill in the art that in other embodiments the Data Pane image may be superimposed upon the entirety of the plot in which case the Active Axes are fused to the actual plot axis. Since the available pixels within the display area is limited, whereas the source data may be much larger in size both in spacial dimensions and in value, Scratching allows the operator to quickly drill down into the displayed image and retrieve deeper source data. In one embodiment of the invention the Data Pane image focus region is moved either back and forth, either in a left and right direction (185), or in a up and down direction (187), by for example moving the mouse cursor. Moving the cursor left to right causes the system to drill down into the data stored in columns or along the Y axis. Moving the cursor up and down causes data to be expanded in the row directions or along the X axis. Moving the cursor in a circular or diagonal fashion causes both actions to happen simultaneously.

In other embodiments in which the Data Pane image is free to move relative to the actual axis of the plot, instead of moving a pointer within the Data Pane image, the operator or user may move the Data Pane image itself. Moving the pointer in this way is analogous to moving the Data Pane image. As the pointer is moved in a left to right direction or in an up and down direction the focus area is expanded. Again moving the pointer or cursor in a circular or diagonal motion will cause both areas to be expanded at the same time. The effect of Scratching is similar to the Data Pane image focus+context effect shown earlier in FIG. 11 but is more intuitive to use, since it allows the user to move the cursor in a manner that gives the sensation of Scratching away the surface of the data plot to reveal more detailed information.

Figure 14:
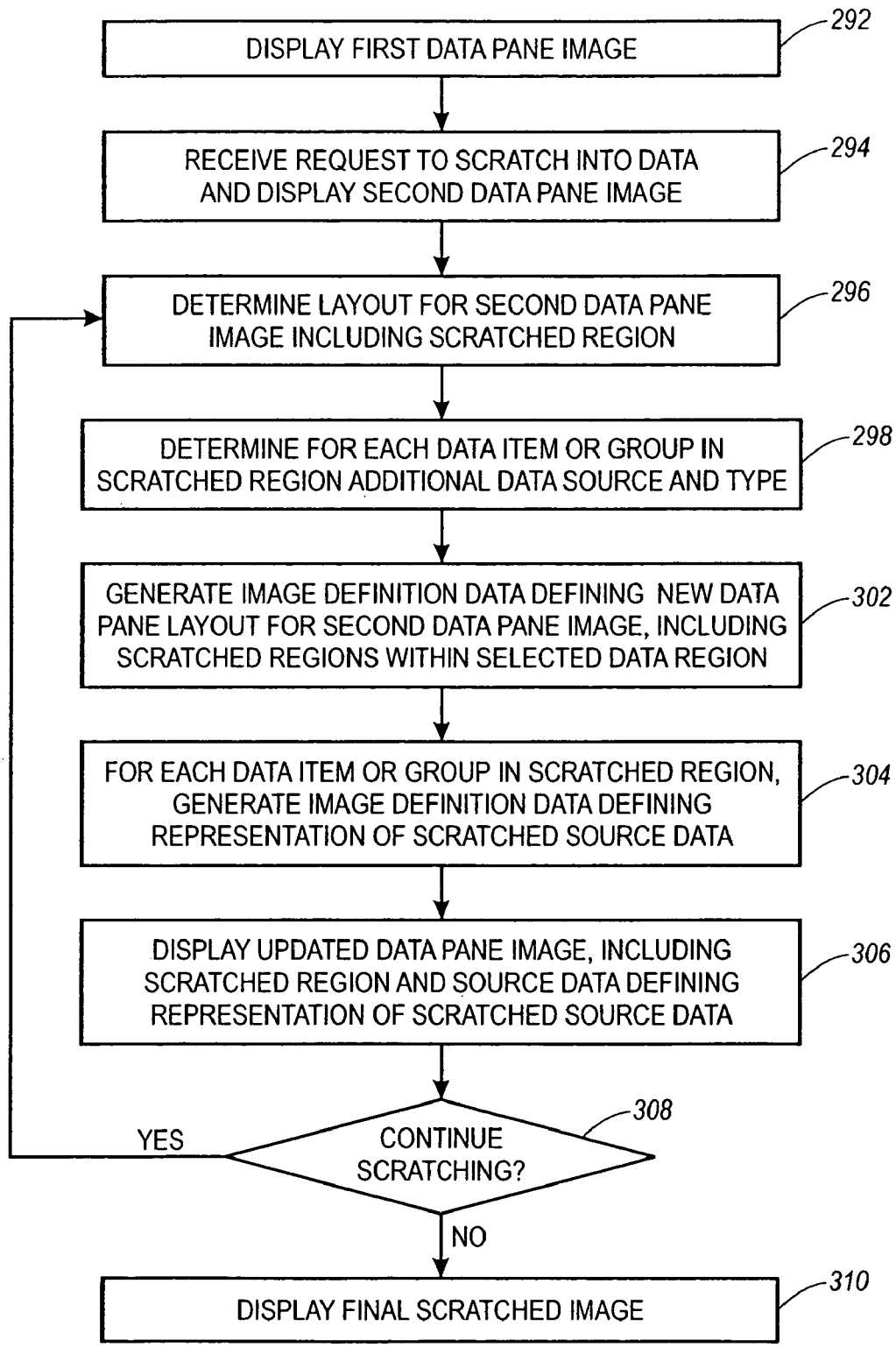
FIG. 14 is a flowchart of a method of Scratching a Data Pane.

FIG. 14 illustrates a method used to Scratch within a Data Pane image in accordance with an embodiment of the invention. In step 292 a first Data Pane image is displayed on the user or operator's screen. At some point, in step 294, the system will receive a request form the operator to Scratch into the data and to display a second Data Pane image in which the focus region is expanded. This request may be in the form of a cursor or mouse movement by the operator or it may be through some keyboard or stylist or trackball input. In one embodiment the operator may signal a request to Scratch into the Data Pane image by depressing a mouse button and by moving the mouse either left, right, up, down or in combination of these motions. The process must then determine in step 296 the layout for the second Data Pane image which includes the Scratched region. In step 298, each data item or group region within the Scratched region is determined together with any additional data source and type values. In step 302 the image definition data is generated for the new Data Pane image layout including the second Data Pane image and all Scratched regions within the selected data region. For each data item or group in the Scratched region an image definition data is generated defining a representation of the Scratched source data. The updated Data Pane image is displayed including the Scratched regions which appear as focus regions, together with source data defining the representation of the Scratched source data. At this point in the process the operator may continue to Scratch within the data in which case additional focus+context regions are generated. If the operator discontinues the Scratching process the final Scratched image is displayed on their screen.

Scratching is particularly useful for drilling down into a display set in two dimensions at the same time. A diagonal scratch simultaneously scratches in both the X and Y direction or dimension at the same time, in proportion to the relative scratch in each direction.

Bumping

Figure 17:
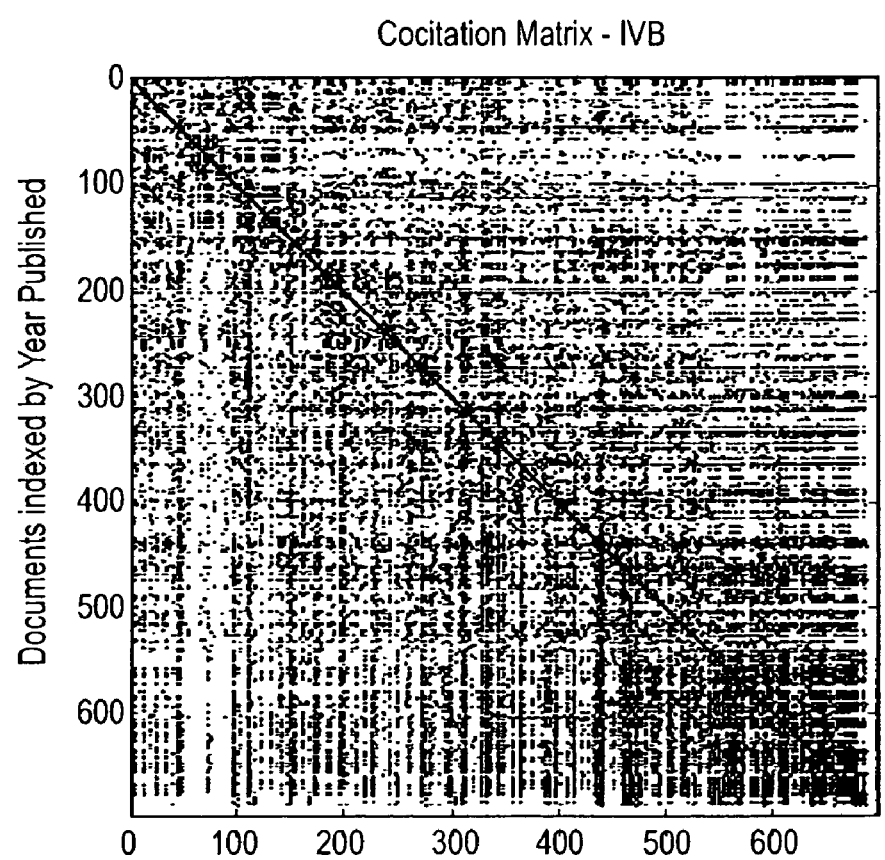
FIG. 17 is an illustration of a bibliographic sample data set for use with the invention.
Figure 18:
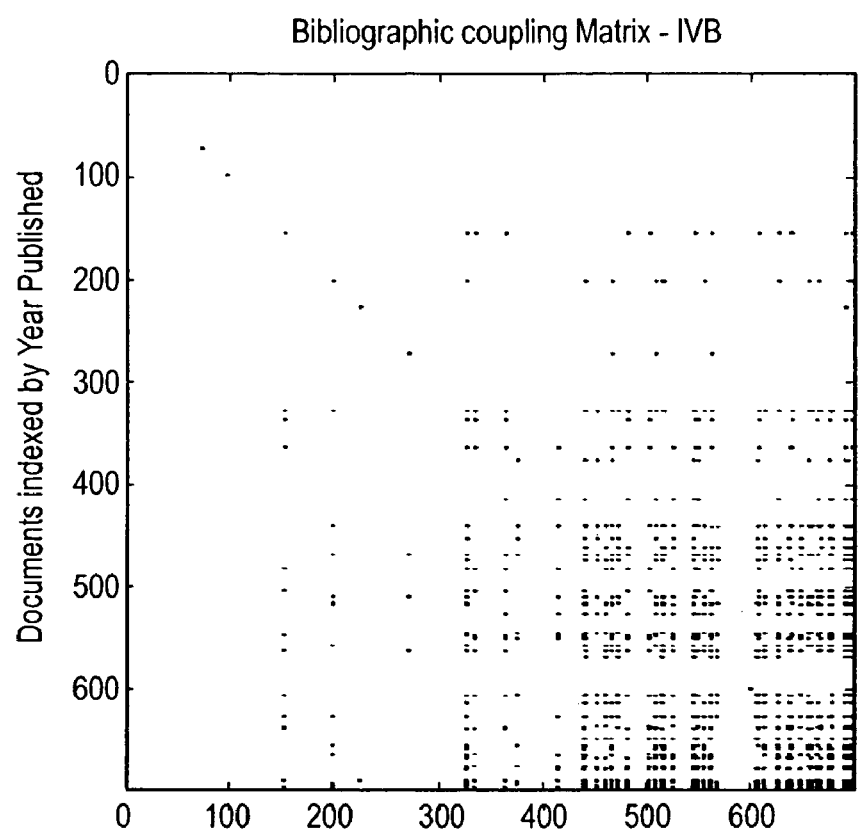
FIG. 18 is a further illustration of a bibliographic sample data set for use with the invention.

Another new and useful interaction technique provided by the invention is referred to herein as "Bumping". Bumping is a display technique to allow a user to easily compare the results of applying two different operations upon the same underlying data set. To illustrate this technique consider the bibliographic data sets shown in FIGS. 17 and 18. Suppose a user wants to understand the relationship between items with high bibliographic coupling (FIG. 18) and high cocitation strengths (FIG. 17). A simple solution would be to take the two matrices and visually compare the two next to each other. An alternative is to subtract one from the other, and plot the result. The problem with first method is that the user must visually compare the values between the two matrices, jumping back and forth between the two, a process that is subjective and prone to errors. The problem with the latter method is that it does not preserve the context of the original matrices—it merely calculates the difference. Using such a method it would be unclear whether a zero value is the result of subtracting two cells or sets of data both having zero-value data, or two cells with both having, for example, 100 as the value.

Bumping is an experimental interaction technique that attempts to alleviate these limitations. To "Bump" a data set, the user first selects a primary plot and a secondary plot for the comparison. The plot for the primary plot is displayed on the screen. The user then selects an algebraic operation on the matrices (addition, subtraction, multiplication, etc.) and the Data Pane plots the result. In a sense, the resulting plot can be thought of as being layered via the algebraic operation over the primary and secondary plots. By Bumping the plot with the mouse, the resulting plot is shifted one pixel in both dimensions and the values for the primary plot is shown. Repeated Bumping of the plot enables the user is able to determine where correlations occur. The direction of the Bump and the number of pixels the resulting plot moves can be controlled by the user. In this manner, the user is able to see the difference between the two plots, set the focus area on a specific region, and Bump the plots to see the underlying data values.

Figure 15:
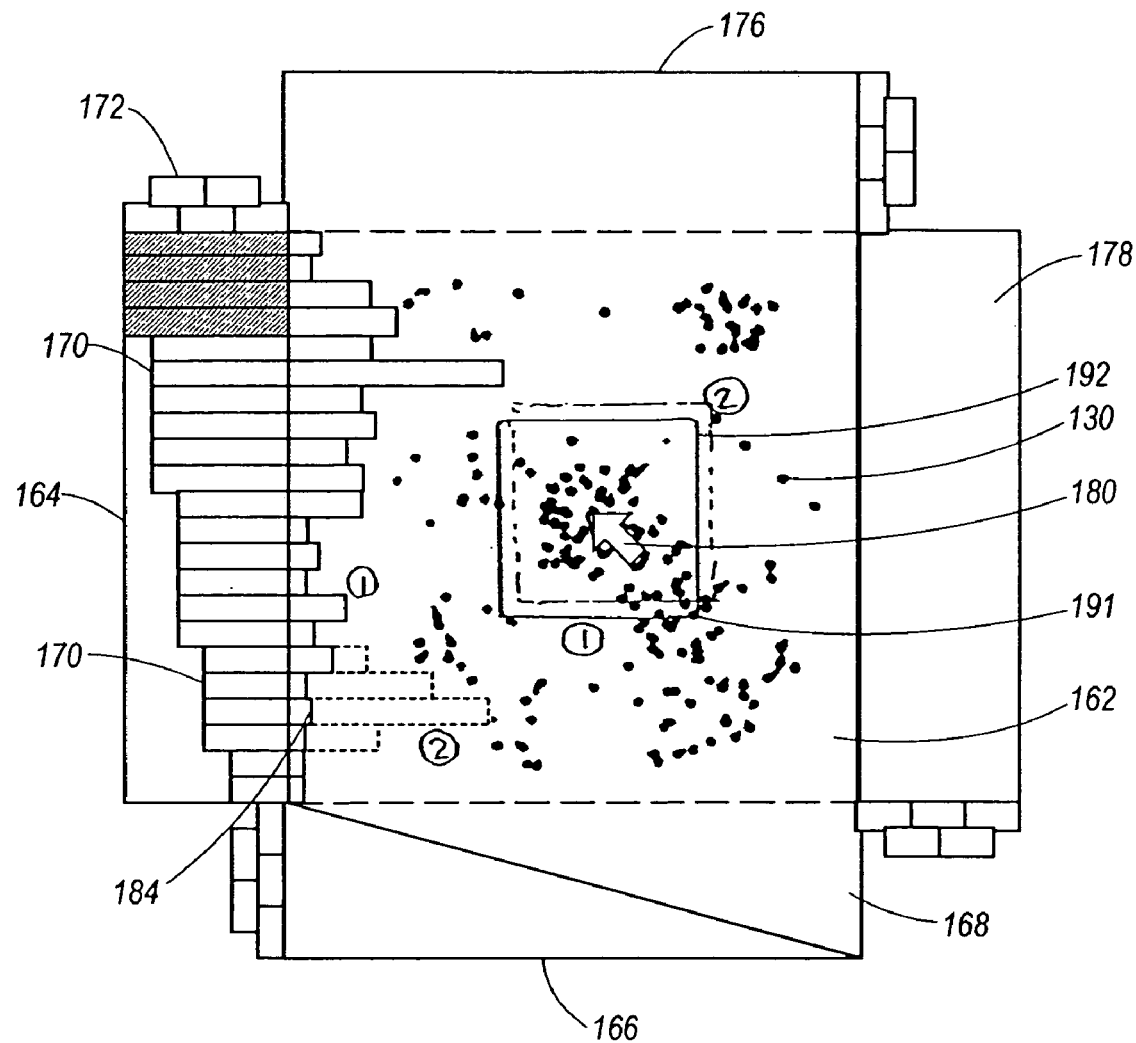
FIG. 15 is an illustration of a Bumping technique for use with the Data Pane.

FIG. 15 illustrates a Bumping technique for use with the invention. As shown in FIG. 15, a Data Pane image originally shows the results due to an algebraic operation on the data plot. When the system receives a request from the user or operator to Bump the Data Pane image, the focus area of the Data Pane image is replaced with an image of the original plot in that area. Again, as with the Scratching technique described earlier, the Data Pane image in this area may cover all or only a portion of the plot. The Data Pane image may be similarly expanded to be fused with the axis of the plot and to cover the entire data area. When the user of operator signals a request to unBump the Data Pane image the view area of the Data Pane is replaced with the original algebraic data again.

Figure 16:
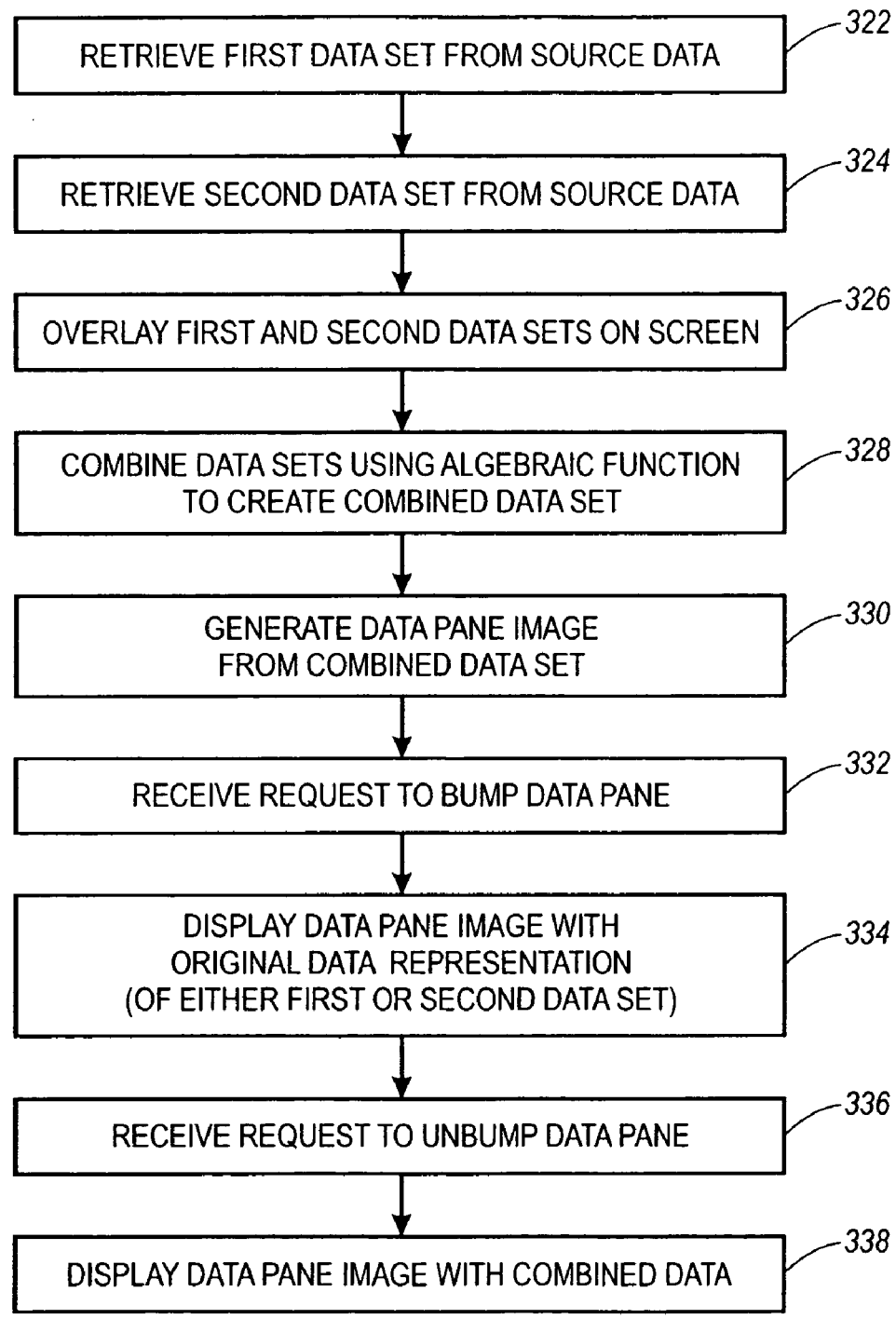
FIG. 16 is a flowchart of a method of Bumping a Data Pane.

FIG. 16 shows a method used to Bump the Data Pane image. As shown in FIG. 16 a first step in the method is to retrieve the first data set from the source data, step 322. The second set of data is then retrieved from the source data in step 324. As a precursor to Bumping the image the first and second data sets may be displayed as an overlay on the operator's screen, step 326 or combined using some algebraic function step 328. The system then generates a combined or algebraic Data Pane image from the combined data, step 330. When the request is received to Bump the Data Pane step 332, the Data Pane image view area is replaced with a view of the original data. This greatly assists the operator in correlating the results of an algebraic operation with the underlying source data. When the system receives a request from the operator to unBump the Data Pane, step 338, the Data Pane image is restored with the original algebraic view.

Bumping is of particular use in multi-dimensional or multi-variate data which is often difficult to display on a two-dimensional display screen or display device. For this reason bumping is a great advantage when examining three-dimensional data. The concept remains the same as described above, but the bumping can be used particularly to temporarily show data in that display region that is related to the displayed data but operates within other dimensions and that would normally be hidden from view.

For example, if a two dimensional plot were rendered in a three dimensional space, the bumping could show the differences (or the result of any other mathematic operator for that matter) between each data point in the plot as projecting out of the plot in the third dimension. To further illustrate this point, consider a case in which two plots showing the linkage structure of the World Wide Web are being analyzed, where the data consists of two the same structure at two different points in time. A useful analysis would be to find those areas of the Web where a lot of links were either added or removed. Using the preferred embodiment described herein, a two-dimensional plot can be rendered where each data point represents the difference between the oldest data set and the newest data set. Bumping the plot would cause the value of the oldest data set to be displayed projecting out into the z-dimension.

Dynamic Interaction

The interactive Data Pane image mapping and display techniques provided by the invention are particularly effective for allowing a user to scratch, interrogate, or otherwise interact within the Data Pane in an intuitive, dynamic manner. The present invention requires little specialized skill by a system user beyond those easily acquired in using a typical application software such as a spreadsheet application. This technique takes the most advantage of human cognition and perception capabilities in providing data in a graphical form and permitting inspection of patterns and trends in a global context.

The techniques can be easily integrated into conventional data display, and other graphical display-oriented applications. When data is stored in a database the invention can be used to dynamically visualize, display, interact with the displayed data and in this manner drill-down into the data stored in the database. For optimal performance, and to better address human perceptual and cognitive abilities, individual display objects can be aggregated into aggregated patterns and shapes. As the user interacts, these shapes "emerge" from the display space. This allows the system user to detect, understand, and appreciate information about the underlying data that is not necessarily included in the data. Individual graphical display objects can be imperceptible to the user, but only become apparent on aggregation.

The combined user interface features enable the system user to perform exploratory data analysis in a highly interactive and natural manner. The interface mechanisms also permit fluid adjustment of the single coherent view of the data between, symbolic, direct, and graphical indirect representations which becomes increasingly important with large and more complex data sets.

Particularly, the dynamic effects described above can be tailored by the user to best suit their cognitive abilities or demands. For example, the scratch dwell time, scratch length, and scratch duration can be used to best control the dynamic performance of the display. A large scratch can introduce a large interrogation into the data, while smaller scratches can just "barely scratch the surface" of the data. The process is akin to changing the magnitude of the interrogation depending on the user interaction.

Since some scratching could be used to interrogate across several order of magnitude of data values, in order to minimize the cognitive load on the user or operator, the system can introduce these changes to the data display within the Data Pane in an animated fashion. Instead of merely jumping from a first view A (before scratch or interaction) to a second view B (after scratch or interaction) the system progressively displays additional animations, e.g. view A1, A2, A3, . . . An, as intermediate interrogation steps. This is used to increase the sensation of fluidity in the display and provide a more useful interaction mechanism for the user. It will be evident that the animation and dynamic interaction techniques described above with respect to scratching can be equally used with other data interrogation and visualization techniques such as bumping.

Workspace Manipulations

In accordance with one embodiment of the invention, the Data Pane makes use of two additional column widgets: a Scratchpad, and an attribute slider. In one embodiment, considering for example the Data Pane image shown in FIG. 5, the Scratchpad 176 is displayed on top of the Data Pane, and the Attribute Slider 178 displayed on the right. Manipulations of these columns do not directly affect the plotting of the X and Y axes. The Scratchpad is a temporary resting place for drag and dropped focus areas to allow the user to perform analyses on smaller subsets of the data.

Preserving the context all the time is not necessarily a good thing, especially when the total number of data items numbers in the millions. To address this, users can select focus areas of interest, drag them onto the Scratch pad, clean the values from either the X or Y column widgets, and then drop the focus area onto that column. The Scratchpad can support multiple focus areas at one time. When a focus area is dropped back onto a column widget, all other data attributes associated with the focus area are accessible once again via the data tabs 177 at the end of each column.

Figure 20:
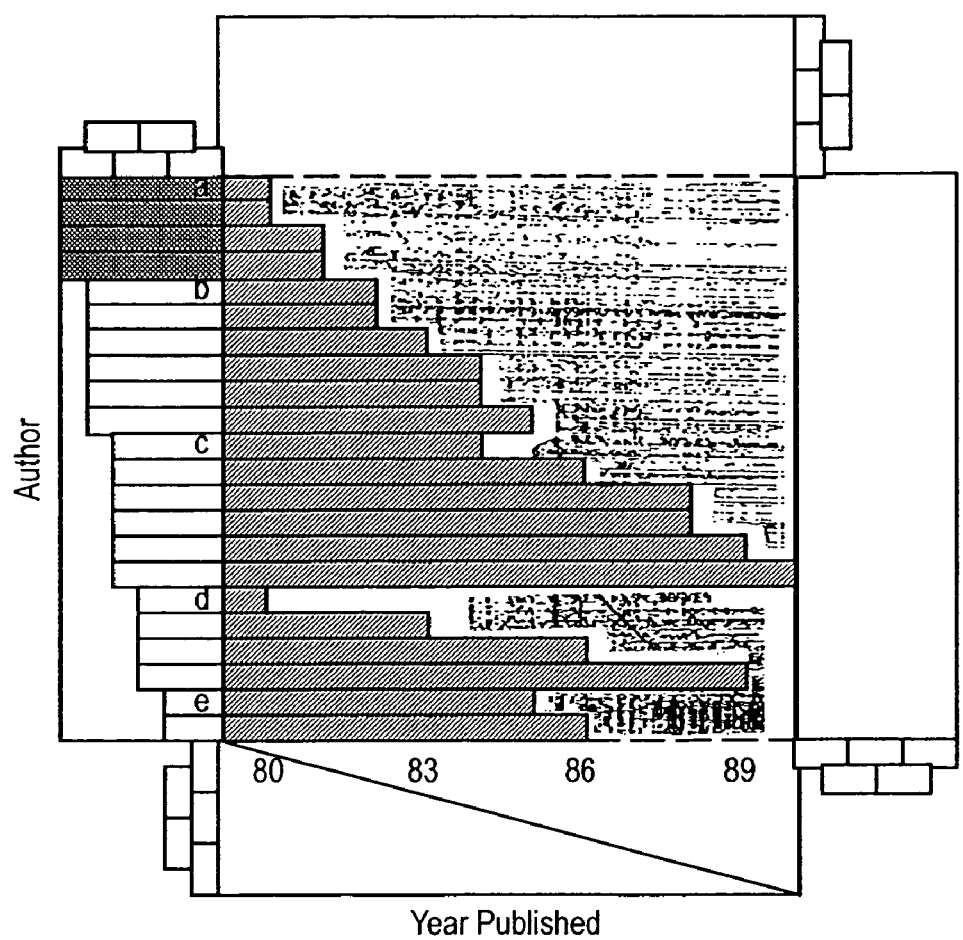
FIG. 20 is an illustration of a plot of the data in FIG. 17 as it might be displayed using a Data Pane.

The Attribute Slider occupies the right column widget. Attributes of the dataset can be selected, displayed as bars that can be manipulated, and have multiple focus areas. Unlike the use of axial columns, manipulation of the Attribute Slider does not affect the layout of the plot or the arrangement or display of data items therein. Instead, the values of the data in the Attribute Slider are highlighted within the plot. FIG. 20 illustrates a data plot in which the Data Pane displays authors by year published. If the user wants to figure out how the venue of publication (i.e. the conference, or journal, etc.) correlates to who published what and when, then the user can select a Venue attribute from the data tabs at the end of the attribute slide, causing the categorical data to be plotted in the column. After sorting by total number of publications, the user creates a focus area over conferences and brushes the mouse over the selected items. For each value being brushed, the corresponding data items that were published in each venue are highlighted. In this manner, three attributes (author, year of publication, and venue) are plotted together with two data values (number of publications per year per author, and whether it was in a particular venue) in a single two-dimensional plot. Via the Attribute Slider, one can instruct the systems to brush/animate the entire sequence of attributes and have the corresponding items be highlighted in the plot area. To exaggerate the effect, an animated display can be generated illustrating the data distribution. This feature is of particular value to animation of time-series data. For example, suppose the Attribute Slider contains graduation date of the authors. The user can create a focus area and instruct the system to move the focus areas through the entire set of values at a definable pace. The result is a highlighting/decay of the graduation date for each author. Since the user is not occupied interacting/controlling the brushing, user attention can be focused on extracting visual patterns elucidated by the animated brushing.

Bibliographic Applications

Large volumes of data create problems for plotting, especially when the range of data being plotted on each axis exceeds the number of pixels available on the screen, as is typically the case with large sparse matrices. Unfortunately, even with higher resolution screens this limit is often reached after 1000 data points (e.g., a 1024×786 screen contains 1024 pixels across and 786 pixels high).

FIG. 17 shows a matrix plot of the cocitation strengths for the Bookplex that exemplifies this limitation. It's impossible from this plot to determine the cocitation strengths for, for example, documents 634 and 666. The plot of FIG. 17 reveals nothing more than a dark blob in that area. The typical process for drilling down requires successive plotting of the data, each time reducing the set of data being plotted. While this enables the user to focus on a particular set of interesting data, it removes the context. The Data Pane overcomes this limitation by employing of the focus+context techniques of magnification and stretching as implemented in technologies such as the Table Lens, but applied to the task of data plotting.

The Data Pane provided by the invention represents a novel information visualization interface for the plotting and interaction with such large data sets and in a particular implementation described below is designed to facilitate the analysis of bibliographic data. One embodiment of the Data Pane can be used to augment the functionality of the Bookplex, a book-like publishing medium developed by Xerox Corporation and described in copending application "MEDIUM CONTAINING INFORMATION GATHERED FROM MATERIAL INCLUDING A SOURCE AND INTERFACE FOR GRAPHICALLY DISPLAYING THE INFORMATION", application Ser. No. 09/488,563, Inventors: Stuart Kent Card, Tobias Hoellerer, James Edward Pitkow, and Richard Carl Gossweiler II, filed Jan. 21, 2000, and incorporated herein by reference. A primary goal of the Data Pane is to provide a better interface to understand the complex relationships between arbitrary data. With respect to the Bookplex, the Data Pane focuses on citation, bibliographic coupling, and cocitation analyses for a collection of citations-a fundamental aspect of the Bookplex. It is important to note that the Data Pane interface and techniques described herein are not limited to citation data. Other potential uses include forms of linkage data like hypertext links as found on the WWW, exploratory data analysis involving large data sets, and categorical data.

The Data Pane system provides many important contributions to the field information visualization and user interface research, that are of use in many scientific areas, including bibliographies:

Support for Active Axes, the binding of focus+context columns to the axes of a plot, The introduction of "Scratching" as a data drill-down method, A "Bumping" feature to show the visual difference between two plots in a context-preserving manner, and The use of Active Sliders to animate and highlight additional attribute against the existing attributes being plotted.

The basic concepts of citation, bibliographic coupling, and cocitation analysis are described below, together with a review of the traditional interfaces used to analyze these forms of bibliometric data. It will be evident to one skilled in the art that while the invention is described hereafter with respect to bibliographic analysis and applications, the invention is not in any way constricted to such applications, but can be used with a wide, if not endless, variety of data types and data analysis systems.

Dating back to the use of the 1873 Shepard's Citations in the legal community, citation indexing has been used to harness the decisions made by authors to include references to relevant previously recorded information. Within the scientific community, these references tend to identify prior research whose methods, equipment, results, etc. influenced the current work. By capturing the semantic judgement of authors and the works of others, citation indexes create a powerful tool that serves three main application areas:

qualitative and quantitative evaluations of scientists, publications, and scientific institutions;

modeling the historical development of science and technology;

information search and retrieval.

A "citation index" is a list of all citations contained within a collection of documents. The citation index can be represented as a directed graph ("citation graph" or citation network) or as as the corresponding incidence matrix for the graph (citation matrix). In the former case, a directed edge between node $D_i$ and $D_j$ indicates that $D_i$ references $D_j$ and that $D_j$ contains a citation from $D_i$. In the latter case, the value of the cell for row $D_i$ and column $D_j$ denotes the number of times document $D_i$ refers to document $D_j$. This number of times a document is cited is called the citation frequency. In this manner, the citation matrix C illustrates the "cites" relationships and the transpose of the citation matrix $C^T$ illustrates the "is-cited-by" relationships. Using the citation matrix, a number of interesting properties are readily computed. If we have m source documents that contain references to n other documents with the corresponding citation matrix $C=(c_{ij})$, then the number of references of a given document $D_i$ is the sum of the row vector for $D_i$ or $(CC^T)_{ij}$;

the number of reference that documents $D_i$ an $D_j$ share in common (called the "bibliographic coupling strength" is given by the equation:

$$\sum_{k=1}^{n} C_{ik} C_{jk} = (CC^T)_{ij}$$

the number of citations received by document $D_i$ is the sum of the column vector for $D_i$ or $(C^T C)_{ij}$;

the number of citations which documents $D_i$ and $D_j$ share in common (called the cocitation strength is given by the equation:

$$\sum_{k=1}^{m} C_{ki}C_{kj} = (C^T C)_{ij}$$

Once a particular document $D_i$ is written or published, the references it makes to other papers are essentially fixed (unless of course there are new version or editions to the published work, but this is not our focus here). Conversely, new or additional papers can be written or published at any later time, that both reference $D_i$ as well the references in $D_i$. At any particular point in time, one can inspect the bibliographic coupling strengths for a set of documents to gain insight into what awareness authors had of each others work. It can also be used to retrieve the set of documents bibliographically coupled to a document. As time progresses, this set of bibliographically coupled items can increase as others cite similar papers. More precisely, when document $D_i$ contains a bibliographic note to $D_j$, the document $D_i$ is said "to reference $D_j$", and the document "$D_j$ has a citation from $D_i$". For the purposes of this document the terms "cites" is used interchangeable with "references" and "is cited by". Cocitation identifies pairs of documents that are references together. Frequently citing documents together implies the shared semantic judgement of authors that the pair of documents $D_i$ $D_j$ are related-even though the two documents may not contain a reference to each other. Cocitation strengths vary overtime and can provide a glimpse into the papers that influence a particular field at any given time. Typical cocitation analysis creates a correlation matrix from the cocitation strengths and applies multidimensional scaling on the results. Visually, when plotted together on a cocitation plot, related documents cluster together, indicating sub-fields within the main field. Analyzing the changing nature of citations creates a dynamic and evolving picture of a particular field over time.

The traditional analysis of bibliographic data is that of creating raw frequency data expressed by means of numbers in a tabular form. It is possible to show the citation, bibliographic coupling, and cocitation strengths between pairs of documents. While this representation contains all three bibliographic analysis techniques, drawing quick conclusions and correlation from the table is difficult. For each item of interest, each non-normalized numeric value must be identified and compared individually against other values-a cognitively demanding task prone to mismatch, incompleteness, and other errors.

Recognizing this, several efforts have been made to advance the field by graphing the results of various multivariate analysis techniques like clustering and multidimensional scaling. By plotting the result of cluster analysis in two-dimensional space, the authors developed a new a technique called cluster co-citation. The purpose of cluster cocitation is to understand the relationship between cocitation clusters, where clusters are initially formed based upon cocitation strengths and the cluster cocitation strengths are then displayed numerically on the arcs between clusters. In this manner, the relationships and their respective strengths between sets of related document clusters can be determined visually. Of course, the results of pure clustering can also be displayed using the complete linkage method of clustering. Multidimensional scaling (MDS) can be used to create a two dimensional plot based on cocitation strengths. In this diagram, individual papers are numbered and hand-drawn circles are added to cluster papers together. Using cocitation data, the MDS plots allow a researcher to gain insight into the relationship between authors by identifying authors that publish on similar topics. It should be noted that cocitation and bibliographic coupling analyses have been performed using authors, papers, and journals as the primary data source. Of course, it is also possible to generate a two dimensional plot of the resulting matrix for each analysis.

One of the primary advantages of binding the columns to the axes is that the distribution of values for each axis are displayed graphically. In this manner, the use of the data column reinforces the intrinsic properties of the data. This provides the same advantage as previously found with the Table Lens. Both systems enable patterns and correlations to be spotted visually. Although shown here for purposes of illustration, in practice monotonically increasing numeric axes are perhaps the least interesting example of this feature, since the progression and distribution of such data are well known (for example "Year Published" in FIG. 20). Categorical data however, leverages this feature quite well since the number of instances per value is typically not normally distributed. From a review of FIG. 20, the distribution of number of publications per author is visually reinforced on the Y axis. The impact of understanding the distribution of non-numeric data becomes even more important as the size of the data set increases.

In prior two dimensional data plotting, the X and Y axis and the values bound to the axes are fixed. For example in FIG. 17 and FIG. 18, the values of the X and Y axes represent document identifiers, with the axis starting at the lower left with the lowest id (0) and monotonically increasing to until the largest id (700). If one wanted to see the result of either the X values of Y values in a different order, one would typically reorder the data and replot that data.

One advantage of Active Axes is that they are interactive. The user can reorder the data via direct manipulation of the axis instead of manipulating the data in a spreadsheet or other data editor. In FIG. 20, the authors are sorted in alphabetical order, but could easily have been sorted by the total number of publications per author, strength of recommendation, etc. Reordering is not limited to sorting. Other reordering methods like random permutations, column minimum degree, non-zero count, and matrix specific reordering can also be implemented. Reordering is accomplished by double clicking to the top of each axis, though other methods like adding handlers to the sides of the axes or using a right click triggered pop-up menu are also possible. Applied to the realm of plotting, this direct manipulation makes the exploratory analysis of data much easier. Different attributes of the dataset are accessible via the set of tabs on the end of each column. This is represented in FIG. 20 as a set of five boxes attached to the sides of each column widget. Clicking on a tab loads the column with the data for the desired attribute into the axis and the plot repaints using the new data. This simple design enhancement enables users to quickly explore the relationships between various attributes without having to switch to a separate window or change the attributes via a pop-up window (as with the "Change Chart Type" option in Excel).

Figure 19:
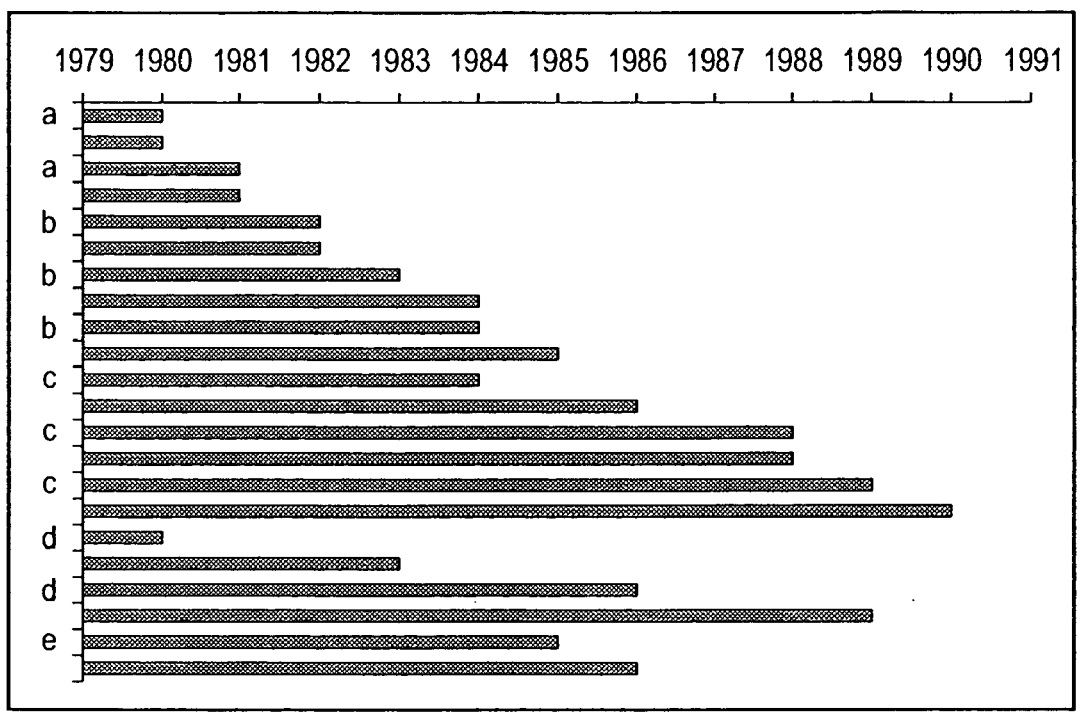
FIG. 19 is an illustration of a plot of the data in FIG. 17 as it might be displayed using a typical spreadsheet software application.

FIG. 20 shows an illustration of the Data Pane that uses Active Axes to plot the data. Here, the categorical data 'author' is plotted against the numeric data 'year published'. Column widgets including two large boxes containing a set of boxes along the left hand side of the Data Pane, and a triangle along the bottom of the Data Pane are fused to the plot to form the X and Y axes. Two additional blank boxes on the right and top of the plot are left blank to act as Scratchpads. The horizontal bars within the Data Pane itself are used to represent or indicate the nature of the underlying source date for example, to indicate that an author has published that year (not the number of times published). In this example, the publication dates for each author are sorted in increasing order. From FIG. 20, we can see that author 'e' published twice, once in 1985 and again in 1986. While it is possible to produce a similar plot in statistical packages like Splus or spreadsheets like Excel, each axes has a limited amount of space to display the text describing the data values. For large data sets. a common heuristic used by such program is to only label every $n^{th}$ item, as in FIG. 19. As shown in FIG. 19, while one can visually inspect the plot to see that author 'c' last published in 1990 and author 'd' first published in 1983, it is impossible to determine without the use of mouse-over triggered "tool tip" when author 'a' stopped publishing and 'b' started. Using the Data Pane, one can readily determine this first and last publication for each authors using the Data Pane in FIG. 20, with or without the use of the text labels or user interaction.

Web Search Application

It will be evident to one skilled in the art that the techniques described above can also be used for interrogation of Web-data, much as a sophisticated Web search mechanism, which has become an important field for serendipitous research or "browsing". Web-based data is typically stored as Uniform Resource Locator (URL) link data. Additional data beyond simply the name of the Web page is often stored with or at the URL, for example primary topics, author, data created etc. Intelligent search mechanism and robot applications can be used to search for all of this Web-related data and store it in one place together with additional data such as subject classification and related links etc. Regardless of whether a stored database, or a real-time search and resultant real-time set, is used, embodiments of the invention are particularly useful for allowing an operator to search through such sets to identify patterns and locate useful related Web pages and URL=s. In this way the operator can perform serendipitous searches through what at first glance may seem like a large an unwieldy collection of unrelated Web pages to find those subsections and individual Web pages of most use to their search. Searching through Web URLs=in this manner is a more natural approach to the typical form of Web browsing that relies on the use of specific search languages, and in any case are inefficient in providing "related matches" in corresponding areas when a particular URL is identified.

System Environment

The method of the present invention may operate when a variety of processor-controlled systems, each of which has the common components, characteristics, and configuration of system 104 illustrated in FIG. 4.

As used herein an image display request may include a request for an operation and information identifying the requested operation, wherein the signal or signals indicate one or more actions by a system user intended to cause performance of the operation. An operation is performed by the system in response to a request when the signals received are for indicating a valid request for a valid operation, and for causing that operation to be performed. Signals indicating a single complete request may include a combination of any number of actions indicated by the user necessary for indicating a valid request for a valid operation and for causing the operation to be performed. Signals indicating user actions may also include signals indicating the selection or movement of a display object visible to the user in display area 146, signals indicating requests that result in operations being performed by central processing and logic unit 148, and signals that result in the central processing and logic unit providing data defining an image for display in display area 146.

The method of the present invention can also provide for displaying the Data Pane images produced in a virtual screen or presentation space for a window, or to the area of a buffer for printing or facsimile transmission, or the like.

The actual manner in which the physical hardware components of system 140 are connected may vary, and may include hardwired physical connections between some or all of the components, connections over wired or wireless communications facilities, such as through remote or local communications networks and infrared and radio connections. For example, memory 152 may include memory that is physically connected to processor 150 as local memory, or that is remotely accessible to processor 150 by means of a wired or wireless communications facility. Thus, in embodiments described above, that define a method that causes processor 150 to access a particular data item, that data item may be stored in a memory device that is remotely located from system, but which is accessible to processor 150 by means of the appropriate connections.

When the method of the present invention is implemented in a system in which the user input device is a pointing or positioning device that eliminates the operators dependence on a keyboard device for the entry of signals, the system of the present invention may be a pen- (stylus-) based computing system, or a small, notebook- or palm-sized processor-controlled system having a small display area for which a keyboard component is not suitable or not included.

Additional details describing the type of hardware system that can be used to operate the method of the invention are given in the table lens patents of Rao and Card, incorporated herein by reference.

The system described above is given for purposes of illustration. The system can be easily integrated into existing hardware devices and software applications. In the case of Web-based data visualization and search techniques, elements of the system may be distributed over various Internet-connected systems and applications.

INDUSTRIAL APPLICABILITY

The invention provides a mechanism for allowing users to interactively explore a complex set of data, particularly two-dimensional data forms such as scatter plots, frequency plots, multi-attribute categorical data, and those other types of data sets that include complex relationships between seemingly arbitrary variables. The Data Pane provided by the invention can be used by anyone who wishes to analyze such data, and provides to the operator a focus+context view into the data that greatly assists in the analysis and exploration of such data. The potential uses for the invention include, for example, the following industries and applications:

Statistical analysis of market research and sales information;
  DNA and genetic data analysis;
  Financial applications, such as stock screening;
  Scientific and engineering applications;
  Bibliographic research and cocitation analysis;
  Expert systems and user preference determination; and,
  Other systems that utilize large amounts of data.

The Data Pane can be used for any application in which a data analyst needs an intelligent tool to better understand the large amount of data presented before them. In particular the Data Pane is ideally suited to the analysis of data sets in which the number of data points far exceeds the number of pixels available per axis for any visual presentation of that data set. In these instances, a simple visual presentation of the data is lacking in the amount of information it can possible convey, and additional tools are required. Instead of forcing the user to try and see and interpret all the data points on their display, the Data Pane provides graphical representations or overlays of the data that assist the user in quickly determining patterns among the data. Similarly, outliers and correlations within the data are also presented in a highly visible manner, allowing a skilled user to quickly scan a large set of information and make rapid decisions on the data stored therein.

The Data Pane follows on from some previous work in focus+context data visualization systems. In this paradigm, the initial view of the data presented to the user is an overall or context view. Each data item is presented as a small object, perhaps only a single pixel. This simple view is comparable to the traditional display generated by traditional data visualization methods, and serves the important purpose of providing the high level overview of how the data is macroscopically scattered. The key element of the focus+context paradigm is that the user can choose patterns or areas within the context view and drill-down or focus on these microscopic areas while the system provides additional information on the data under examination. During focusing only the area of interest is expanded, much like how a magnifying glass operates. The remaining areas remain in context, or unfocused, but still do an important job in acting as a visible background of data, over which the Data Pane may be moved as the operator continues their analysis.

The important features and benefits of the invention lies in the fusing of the Table Lens column widget to the axes of plotted data. The focus+context enhancements of Scratching and Bumping provide user a new set of interaction techniques particularly designed for plotting large data sets. Active Sliders allow even more data attributes and values to be plotted in a compact, straight forward manner. By using the Data Pane, Bookplex users will hopefully be able to better understand the relationships between the various bibliometric computations. Although the Data Pane has not been implemented, hopefully there is enough of the described in this IP to provide the reviewer with the gist of the invention.

Several advantages are immediately apparent from the method and system of the present invention. The present invention requires very little specialized skill by the system user beyond the skills already acquired in using an application program that presents and allows manipulation of table images. Moreover, the technique takes advantage of human cognition and perception capabilities by providing character data in a graphical form to permit inspection of the data for patterns and trends in a global context. In addition, the table image presentation technique of the present invention provides improved spatially and temporally efficient access to the data in the information data structure by maintaining a user-controlled focus plus global context view of the information. The technique can be easily integrated into conventional spreadsheet and other table-oriented application programs.

The foregoing description of the present invention has been provided for the purposes of illustration and description. It is not intended to be exhaustive or to limit the invention to the precise forms disclosed. Obviously, many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. An interactive data analysis system, comprising:
    a display device for two-dimensional display of data having a first variable and a second variable;
    a data retrieval mechanism for retrieving data and displaying it as a data display on said display device, wherein said data display is one of a scatter plot or contour plot of said data;
    image display instructions for overlaying upon said data display an interactive analysis tool, said image display instructions include instructions for generating a data display region, an active axis mapped to a variable component of said data, and a focus region defining a subset of said data display region; and,
    display object generation logic for mapping, via a mapping operation, the data within said focus region to one of a plurality of display objects in said active axis; and,
    a user input mechanism for inputting instructions to said data analysis system to modify the operation of said focus region, said modification causes said display object generation logic to again map said data within said focus region to one of a single or plurality of display objects in said active axis.

2. The system of claim 1 wherein said interaction with said active axis allows said mapping operation to be modified to perform an alternate mapping of said active axis to said first variable component, and to modify the focus region of said data pane.

3. The system of claim 1 wherein said data pane image includes a first active axis along a first axis of said plot mapped to a first variable component of said data, and a second active axis along a second axis of said plot mapped to a second variable component of said data.

4. The system of claim 1 further comprising:
    instructions for scratching within said data pane image, allowing a user to move a cursor over data displayed within the data pane image, said movement causes said focus area to be enlarged.

5. The system of claim 1 further comprising:
    instructions for bumping within said data pane image, allowing a user to replace a first mapping operation associated with said active axis with a second mapping operation and to toggle the display of the effect of said mapping operations from a first to a second operation.

6. The system of claim 1 further comprising:
    an attribute slider, for replacing the display of said first and said second attribute with said third attribute.

7. A system for interactive data analysis, comprising:
    a display device for displaying a set of data as a two-dimensional data plot, wherein said data plot is one of a scatter plot or contour plot of said data;
    a data pane image generation logic for overlaying a data pane image with said two-dimensional data plot, said data pane image includes a focus region, wherein said data pane image generation logic further includes instructions for mapping data displayed within said focus region to one or more display objects to be displayed in conjunction with said data pane image; and a user input device for inputting instructions to said data pane image generation logic to interact with and control the operation of said focus region;

wherein each data item of said two-dimensional plot includes a first variable component and a second variable component, and wherein said data pane image includes an active axis mapped to a first variable component of said data and wherein interaction with said active axis allows said mapping operation to be modified to perform an alternate mapping of said active axis to said first variable component.

8. The system of claim 7 wherein said data pane image includes a first active axis along a first axis of said plot mapped to a first variable component of said data, and a second active axis along a second axis of said plot mapped to a second variable component of said data.

9. The system of claim 7 further comprising:

means for scratching within said data pane image, allowing a user to move a cursor over data displayed within the data pane image and cause said focus area to be enlarged.

10. The system of claim 7 further comprising:

means for bumping within said data pane image, allowing a user to toggle the display of the effect of said mapping operations from a first to a second operation.

11. The system of claim 7 further comprising:

an attribute slider for selecting a third variable component associated with said data item, and replacing the display of said first and said second attribute with said third attribute.

12. A system for interactive data analysis, comprising a processor-based machine including a memory and instructions stored therein for:

retrieving a set of source data to be analyzed;

displaying said set of source data as a two-dimensional data plot, wherein said data plot is one of a scatter plot or contour plot of said data;

overlaying a data pane image in combination with said two-dimensional data plot, said data pane image includes an active axis mapped to a first component variable of said data and a focus region defining a subset of said two-dimensional data plot;

mapping, using a mapping operation, source data within said focus region to one or more display objects;

displaying said display objects in said data pane image;

receiving input from a user to interact with said active axis and to reposition said focus region to a second focus region; and regenerating said data pane image and said display objects to represent a subset of source data displayed within said second focus region.

13. The system of claim 12 wherein said interaction with said active axis allows said mapping operation to be modified to perform an alternate mapping of said active axis to said first variable component.

14. The system of claim 12 wherein said data pane image includes a first active axis along a first axis of said plot mapped to a first variable component of said data, and a second active axis along a second axis of said plot mapped to a second variable component of said data.

15. The system of claim 12 further comprising:

instructions for scratching within said data pane image, allowing a user to move a cursor over data displayed within the data pane image and cause said focus area to be enlarged.

16. The system of claim 12 further comprising:

instructions for bumping within said data pane image, allowing a user to replace a first mapping operation associated with said active axis with a second mapping operation and to toggle the display of the effect of said mapping operations from a first to a second operation.

17. The system of claim 12 further comprising:

an attribute slider for replacing the display of said first and said second attribute with said third attribute.

18. A system for allowing a user to interactively analyze data, including a processor-based machine having a memory, said memory including instructions for:

retrieving items of data from a data storage device;

displaying said data as a two-dimensional plot upon a display device, wherein said plot is one of a scatter plot or contour plot of said data;

overlaying a data pane window upon said data, said data pane window including a focus area; and allowing a user to examine said data via an input device that controls the position of said focus area, wherein moving the focus area to a position within said data pane causes the data represented within said focus area to be retrieved from said memory, and mapped using a mapping operation to a plurality of display objects for display within said data pane window;

wherein said data cane window includes an active axis mapped to a component variable of said data and wherein interaction with said active axis allows said mapping operation to be modified to perform an alternate mapping of said active axis to said first variable component, and to modify the focus region of said data pane.

19. The system of claim 18 wherein said data pane image includes a first active axis along a first axis of said plot mapped to a first variable component of said data, and a second active axis along a second axis of said plot mapped to a second variable component of said data.

20. The system of claim 18 further comprising:

instructions for scratching within said data pane image, allowing a user to move a cursor over data displayed within the data pane image, said movement causes said focus area to be enlarged.

21. The system of claim 18 further comprising:

instructions for bumping within said data pane image, allowing a user to replace a first mapping operation associated with said active axis with a second mapping operation and to toggle the display of the effect of said mapping operations from a first to a second operation.

22. The system of claim 19 further comprising:

an attribute slider for replacing the display of said first and said second attribute with said third attribute.

23. A method of allowing a user to interactively analyze data, comprising the steps of:

retrieving a set of source data to be analyzed;

displaying said set of source data as a two-dimensional data plot, wherein said data plot is one of a scatter plot or contour plot of said data;

overlaying a data pane image in combination with said two-dimensional data plot, said data pane image includes a focus region defining a subset of said two-dimensional data plot;

mapping, using a mapping operation, source data within said focus region to one or more display objects;

displaying said display objects in said data pane image; and receiving input from a user to interact with or reposition said focus region to a second focus region, regenerating said data pane image, and said display objects to represent a subset of source data displayed within said second focus region;

wherein said data cane image includes an active axis mapped to a first component variable of said data and wherein interaction with said active axis allows said mapping operation to be modified to perform an alternate mapping of said active axis to said first variable component, and to modify the focus region of said data pane.

24. The method of claim 23 wherein said data pane image includes a first active axis along a first axis of said plot, said first active axis mapped to a first variable component of said data, and a second active axis along a second axis of said plot, said second active axis mapped to a second variable component of said data.

25. The method of claim 23 further comprising:
instructions for scratching within said data pane image, allowing a user to move a cursor over data displayed within the data pane image, said movement of said cursor causes an interaction with said active axis to affect the mapping operation, and causes said focus area to be enlarged.

26. The method of claim 23 further comprising:
instructions for bumping within said data pane image, allowing a user to replace a first mapping operation associated with said active axis with a second mapping operation, and to toggle the display of the effect of said mapping operations from a first to a second operation.

27. The method of claim 24 further comprising:
an attribute slider, said instructions select a third variable component associated with said data item, and replaces the display of said first and said second attribute with said third attribute.

28. A method of allowing a user to interactively analyze data, comprising the steps of:
retrieving items of data from a data storage device;
displaying said data as a two-dimensional plot upon a display device, wherein said data plot is one of a scatter plot or contour plot of said data;
overlaying a data pane window upon said data, said data pane window includes a focus area; and
allowing a user to examine said data via an input device that controls the position of said focus area, wherein moving the focus area to a position within said data pane causes the data represented within said focus area to be retrieved from said memory, and mapped using a mapping operation to a plurality of display objects, for display within said data pane window;
wherein said data pane window includes an active axis mapped to a component variable of said data and wherein interaction with said active axis allows said mapping operation to be modified to perform an alternate mapping of said active axis to said first variable component. and to modify the focus region of said data pane.

29. The method of claim 28 wherein said data pane image includes a first active axis along a first axis of said plot, said first active axis mapped to a first variable component of said data, and a second active axis along a second axis of said plot, said second active axis mapped to a second variable component of said data.

30. The method of claim 28 further comprising:
instructions for scratching within said data pane image, allowing a user to move a cursor over data displayed within the data pane image, said movement of said cursor causes an interaction with said active axis to affect the mapping operation, and causes said focus area to be enlarged.

31. The method of claim 28 further comprising:
instructions for bumping within said data pane image, allowing a user to replace a first mapping operation associated with said active axis with a second mapping operation, and to toggle the display of the effect of said mapping operations from a first to a second operation.

32. The method of claim 29 further comprising:
an attribute slider, said instructions select a third variable component associated with said data item, and replaces the display of said first and said second attribute with said third attribute.

33. An interactive data analysis system, comprising:
a display device for two-dimensional display of data having a first variable and a second variable;
a data retrieval mechanism for retrieving data and displaying it as a data display on said display device;
image display instructions for overlaying upon said data display an interactive analysis tool, said image display instructions include instructions for generating a data display region, an active axis, and a focus region defining a subset of said data display region;
display object generation logic for mapping, via a mapping operation, the data within said focus region to one of a plurality of display objects in said active axis;
a user input mechanism for inputting instructions to said data analysis system to modify the operation of said focus region, said modification causes said display object generation logic to again map said data within said focus region to one of a single or plurality of display objects in said active axis; and
instructions for bumping within said data pane image, allowing a user to replace a first mapping operation associated with said active axis with a second mapping operation and to toggle the display of the effect of said mapping operations from a first to a second operation.

34. An interactive data analysis system, comprising:
a display device for two-dimensional display of data having a first variable and a second variable;
a data retrieval mechanism for retrieving data and displaying it as a data display on said display device;
image display instructions for overlaying upon said data display an interactive analysis tool, said image display instructions include instructions for generating a data display region, an active axis, and a focus region defining a subset of said data display region;
display object generation logic for mapping, via a mapping operation, the data within said focus region to one of a plurality of display objects in said active axis;
a user input mechanism for inputting instructions to said data analysis system to modify the operation of said focus region, said modification causes said display object generation logic to again map said data within said focus region to one of a single or plurality of display objects in said active axis; and
an attribute slider, for replacing the display of said first and said second attribute with said third attribute.

35. A system for interactive data analysis, comprising:
a display device for displaying a set of data as a two-dimensional data plot;
a data pane image generation logic for overlaying a data pane image with said two-dimensional data plot, said data pane image includes a focus region, wherein said data pane image generation logic further includes instructions for mapping data displayed within said focus region to one or more display objects to be displayed in conjunction with said data pane image;
a user input device for inputting instructions to said data pane image generation logic to interact with and control the operation of said focus region; and
means for bumping within said data pane image, allowing a user to toggle the display of the effect of said mapping operations from a first to a second operation.

36. A system for interactive data analysis, comprising:
a display device for displaying a set of data as a two-dimensional data plot;
a data pane image generation logic for overlaying a data pane image with said two-dimensional data plot, said data pane image includes a focus region, wherein said data pane image generation logic further includes instructions for mapping data displayed within said focus region to one or more display objects to be displayed in conjunction with said data pane image;
a user input device for inputting instructions to said data pane image generation logic to interact with and control the operation of said focus region;
wherein each data item of said two-dimensional data plot includes a first variable component and a second variable component, and wherein said data pane image includes an active axis mapped to a first variable component of said data and wherein interaction with said active axis allows said mapping operation to be modified to perform an alternate mapping of said active axis to said first variable component; and
wherein the system further comprises an attribute slider for selecting a third variable component associated with said data item, and replacing the display of said first and said second attribute with said third attribute.

37. A method of allowing a user to interactively analyze data, comprising the steps of:
retrieving items of data from a data storage device;
displaying said data as a two-dimensional plot upon a display device;
overlaying a data pane window upon said data, said data pane window includes a focus area;
allowing a user to examine said data via an input device that controls the position of said focus area, wherein moving the focus area to a position within said data pane causes the data represented within said focus area to be retrieved from said memory, and mapped using a mapping operation to a plurality of display objects, for display within said data pane window;
wherein said data pane window includes an active axis mapped to a component variable of said data and wherein interaction with said active axis allows said mapping operation to be modified to perform an alternate mapping of said active axis to said first variable component, and to modify the focus region of said data pane; and
wherein the method further comprises allowing for bumping within said data pane image, allowing a user to replace a first mapping operation associated with said active axis with a second mapping operation, and to toggle the display of the effect of said mapping operations from a first to a second operation.

38. A method of allowing a user to interactively analyze data, comprising the steps of:
retrieving items of data from a data storage device;
displaying said data as a two-dimensional plot upon a display device;
overlaying a data pane window upon said data, said data pane window includes a focus area;
allowing a user to examine said data via an input device that controls the position of said focus area, wherein moving the focus area to a position within said data pane causes the data represented within said focus area to be retrieved from said memory, and mapped using a mapping operation to a plurality of display objects, for display within said data pane window;
wherein said data pane window includes an active axis mapped to a component variable of said data and wherein interaction with said active axis allows said mapping operation to be modified to perform an alternate mapping of said active axis to said first variable component, and to modify the focus region of said data pane;
wherein said data pane image includes a first active axis along a first axis of said plot, said first active axis mapped to a first variable component of said data, and a second active axis along a second axis of said plot, said second active axis mapped to a second variable component of said data; and
wherein the method further comprises providing an attribute slider that allows for selecting a third variable component associated with said data item, and replaces the display of said first and said second attribute with said third attribute.

* * * * *